INVENTOR.
RICHARD E. HAVER 3,523,174
WELDING TIMING CIRCUIT
Richard E. Haver, Detroit, Mich., assignor to Robotron Corporation, Detroit, Mich., a corporation of Michigan
Filed May 25, 1964, Ser. No. 369,727
Int. Cl. B23k 9/10
U.S. Cl. 219—108                                 18 Claims

ABSTRACT OF THE DISCLOSURE

An initiating unit upon actuation of a pilot switch closes a plurality of relay contacts for allowing operation thereof and also provides a signal for energizing a conditioning unit. The conditioning unit, also fed by a synchronized signal from a synch generator, returns a precisely timed signal to the initiating unit to maintain same in operation after the release of the pilot switch whereby said initiating unit continues to energize said conditioning unit and to maintain said contacts closed. The conditioning unit also energizes a solenoid control unit for applying the welding electrodes to the workpiece, and starts a timing unit which times the functions of the welding sequence. The charging of a single capacitor times all of said functions for increased accuracy in timing. A heat control circuit, fed by a standard phase-shifted source, controls the turning on of a first valve, conveniently a semiconductor controlled rectifier. The turning on of a second valve in series with the first valve occurs at a preselected time after the switching of the timing unit to the weld function. Concurrent turning on of both valves allows a pair of ignitrons in a firing unit to be fired alternately to energize the welding head with pulses of alternating polarity having precisely controlled time intervals and hence magnitudes. Thus, a single phase-shift source controls both ignitrons. Means are provided for selecting single or repeat modes of operation of the apparatus.

This invention relates to an electrical timer for multi-function timing and, particularly, to a type thereof utilizing solid-state components and which is primarily adapted for controlling electrical resistance welding machines.

The present invention arose out of a need for controlling an electrical resistance welding machine and accordingly the specific embodiment of the invention herein chosen to illustrate same is primarily adapted for controlling an electrical resistance welding machine. It will be recognized, however, that at least the broader principles of the invention will be applicable to other forms of multifunction timing and the invention will be understood accordingly.

In providing multifunction timing, particularly for supplying and controlling an electrical resistance welding machine, there are a number of problems which have been recognized in the past but which have been tolerated as inherent in the use of equipment of this general nature. Foremost among these problems has been that of providing a completely stable circuit such that its operation will repeat reliably, which will be unaffected by variations in voltage supplied thereto and which will have a minimum of mechanically movable parts. The present invention has been developed in pursuance of a constant effort to meet these foregoing-stated requirements and the hereinafter-described circuit has proved a significant step in this direction.

Further, and more specifically, one problem in supplying a welding circuit arises from the fact that the welding electrodes are normally supplied through a pair of ignitrons, each thereof being intermittently conductive to one polarity of the supplied voltage. The firing of these ignitrons is normally accomplished by means which include a phase-shift circuit, there normally being one such circuit for each ignitron. While these circuits are usually balanced, there have been in the past instances where variations in components of the separate phase-shift circuits have caused some inequality in the output of said phase-shift circuits with respect to each other and this has in turn resulted in some inequality in the relative points in the supply wave at which the above-mentioned ignitrons have been caused to conduct. Thus, a different amount of one polarity of the supply wave is often supplied to the welding transformer as compared to the other polarity of the supply wave and this not only may damage the welding transformer but, when said unbalance becomes excessive, or when a welding cycle or welding sequence lasts for only a few cycles of the supply power, this may cause a defective weld. It therefore would be advantageous if a supply circuit could be provided in which this possibility of unbalance between the portions of the power supply could be eliminated.

Another aspect of the foregoing-described situation develops in some circumstances where one portion of the phase-shift heat control becomes entirely inoperative where one thyratron or where one ignitron associated therewith becomes nonconductive. Under such circumstances, the other half of the firing circuit may still supply the welding electrodes but at a considerably reduced heat whereby the welds formed will be defective. While these circumstances normally manifest themselves by considerable noise emanating from the welding transformer, the operator does not always pay attention to this and the situation may continue until extreme damage is done to the welding transformer, which damage may in certain instances occur very quickly. Therefore, it is desirable to provide a heat control circuit in which a single output will energize both sides of the welding contactor whereby a failure in said heat control circuit will manifest itself by complete failure of the welding operation and thereby result in a signal which the operator cannot ignore.

In view of these and other problems which have previously existed with equipment of this general type, the objects of the present invention include:

(1) To provide an electronic sequence control and timing circuit which will have an extremely high degree of stability and reliability.

(2) To provide a circuit, as aforesaid, in which the electric valves thereof will consist entirely of solid-state components.

(3) To provide a circuit, as aforesaid, in which the desired timing functions are carried out with a minimum number of parts.

(4) To provide an apparatus, as aforesaid, having a single output from heat control means which will control both positive and negative portions of a power supply to the welding transformer whereby variations in components within the said heat control means will affect uniformly both polarities of the power supply appearing at the welding transformer.

(5) To provide apparatus, as aforesaid, wherein the heat control for the welding electrodes is supplied from phase-shift means and in which both the positive and negative halves of the power supply to the welding transformer are controlled from a single output from said phase-shift means.

(6) To provide timing apparatus, as aforesaid, which will have a high degree of precision in carrying out its timing functions and, particularly, wherein periods as short as one or two cycles of a 60-cycle power supply may be accurately timed.

Other objects and purposes of the invention will be apparent to persons acquainted with apparatus of this general type upon reading the following description and inspection of the accompanying drawings.

GENERAL DESCRIPTION

Figure 1:
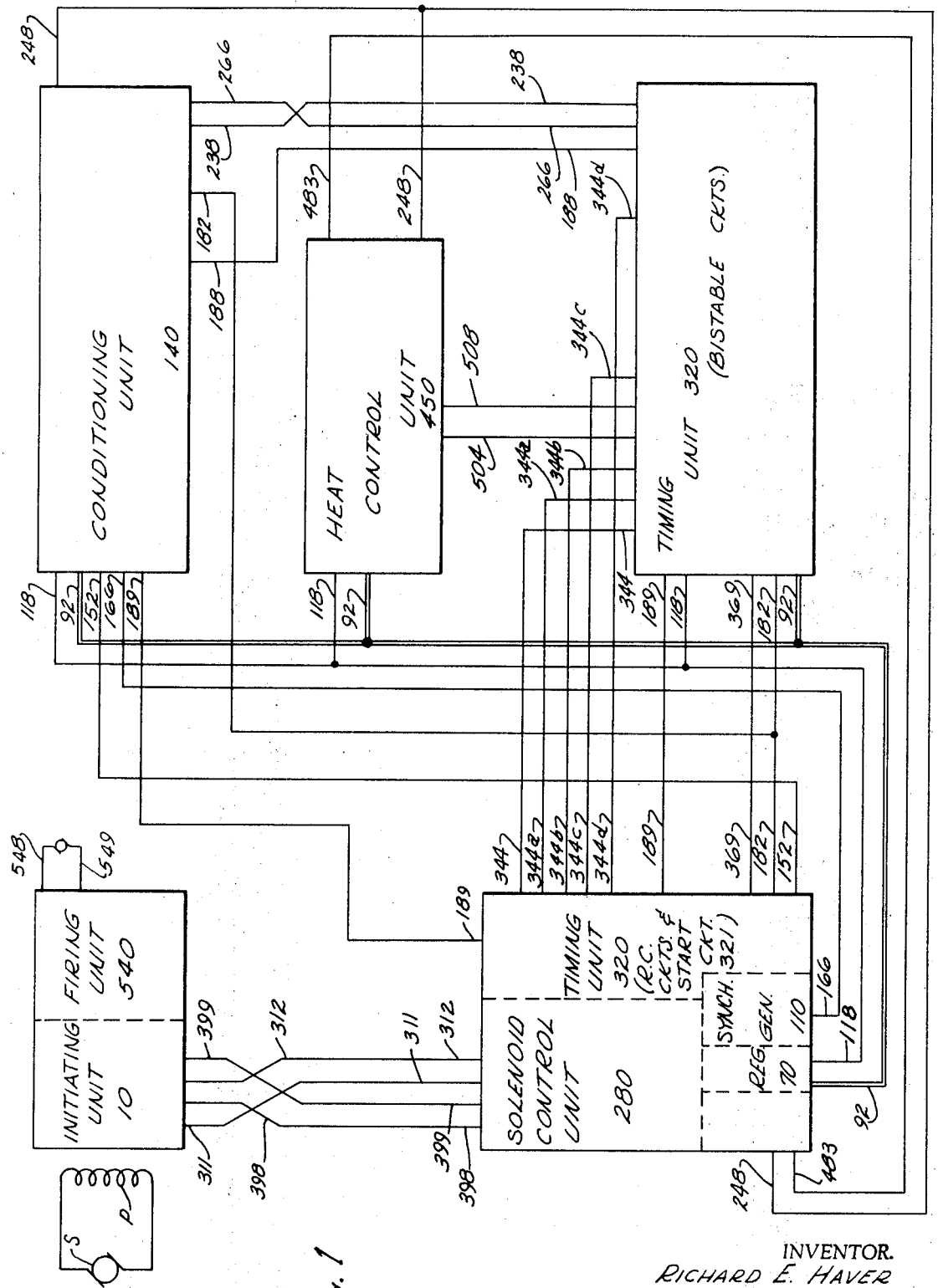
FIG. 1 is a block diagram of the welding timer embodying the invention.

An initiating unit upon actuation of a pilot switch closes a plurality of relay contacts for allowing operation thereof and also provides a signal for energizing a conditioning unit. The conditioning unit, also fed by a synchronized signal from a synch generator, returns a precisely timed signal to the initiating unit to maintain same in operation after the release of the pilot switch whereby said initiating unit continues to energize said conditioning unit and to maintain said contacts closed. The conditioning unit also energizes a solenoid control unit for applying the welding electrodes to the workpiece, and starts a timing unit which times the functions of the welding sequence. The charging of a single capacitor times all of said functions for increased accuracy in timing. A heat control circuit, fed by a standard phase-shiftted source, controls the turning on of a first valve, conveniently a semiconductor controlled rectifier. The turning on of a second valve in series with the first valve occurs at a preselected time after the switching of the timing unit to the weld function. Concurrent turning on of both valves allows a pair of ignitrons in a firing unit to be fired alternately to energize the welding head with pulses of alternating polarity having precisely controlled time intervals and hence magnitudes. Thus, a single phase-shift source controls both ignitrons. Means are provided for selecting single or repeat modes of operation of the apparatus.

DETAILED DESCRIPTION

Generally, the welding timer embodying the invention may be thought of as being comprised of a plurality of interlinked units. For purposes of convenience in description, therefore, and for a clearer understanding of the timer, same will be described in terms of the following units: initiating unit 10, voltage regulating unit 70, synch generator 110, conditioning unit 140, solenoid control unit 280, timing unit 320, heat control unit 450, firing unit 540 and reset unit 400. Also for purposes of convenience in reference, transistors employed in the disclosed embodiments of these units will be understood to be NPN types unless otherwise stated. However, the invention may be carried out with nonlinear devices of other types and polarities if desired with suitable modifications of the circuitry, e.g., in the operating voltage supplies, which will be understood by those skilled in the art.

(a) Initiating unit 10

The initiating unit 10 (FIG. 2) is fed by the secondary 12 of an input transformer 11, the primary P (FIG. 1) of which is connected to a convenient source of alternating supply voltage. The primary winding 13 (FIG. 2) of a transformer 14 and a diode 15 in series therewith are shunted by a capacitor 16 which is connected across the secondary winding 12. The anode of a semiconductor controlled rectifier 17 (hereinafter referred to for convenience by the trade term "S.C.R.") is connected through the primary winding 18 of a transformer 19 and a diode 21 to the upper end of the secondary 12, and the cathode of said S.C.R. is connected through a normally open pilot switch 22 to the lower end of the secondary winding 12. A resistance 20 is shunted across primary 18.

The secondary winding 23 of the transformer 14 hereinabove described is connected at one side thereof to the cathode of the S.C.R. 17 and at the other side thereof through a diode 24 and resistance 26 to the gate of said S.C.R. 17. A capacitance 27 and resistance 28 shunt the secondary winding 23 and a resistance 29 and capacitance 31 shunt the gate of the S.C.R. 17 to the cathode thereof for controlling the signal applied to said gate by the secondary winding 23.

The input transformer 11 has a further secondary winding 32 which is shunted by a capacitor 33 and which connects through a normally closed shut-off switch 34 to the anode of a diode 36. The cathode of the diode 36 feeds a parallel network 37 having legs comprised of a relatively high resistance 38, a relay coil 39, a relatively low resistance 41 connected to the cathode end of a diode 42, and the primary winding 43 of a transformer 24. The remaining end of the network 37 is connected to the anode end of an S.C.R. 46, the cathode of which is connected thtrough a pair of contacts 47 of the relay 39 to the other end of the secondary 32 of the input transformer 11.

A secondary winding 51 of the transformer 19 described hereinabove has a parallel resistance 52 and capacitance 53 shunted thereacross and is in series with a positively oriented diode 54, a dropping resistance 56, and the gate and cathode of the S.C.R. 46. The secondary winding 57 of a transformer 58 hereinafter to be described has a capacitance 59 shunted thereacross and is, through a positively oriented diode 61, also connected in series with the above-mentioned resistance 55 and gate and cathode of the S.C.R. 46. The gate of S.C.R. 46 is shunted to the cathode thereof by a parallel capacitance 62 and resistance 63. The cathode of the S.C.R. 17 is connected through a negatively oriented diode 64 and the contacts 47 to the connection of the secondary windings 12 and 32 of the input transformer 11.

The initiating unit 10 starts the conditioning unit 140 by means of a signal impressed on the transformer 44 due to conduction of the S.C.R. 46. However, before describing the conditioning unit 140, the voltage regulating unit 70 and the synch generator 110 will be briefly described because the outputs thereof are also necessary to the functioning of the conditioning unit 140.

(b) Voltage regulating unit 70

The ends of a third secondary winding 71 (FIG. 4) of the input transformer 11 connect through a conventional, filtered full-wave rectifier, comprising the positively oriented diodes 73 and 74, the resistance 76 and shunt capacitor 77, to the positive input terminal of the regulator 70. The winding 71 has a center tap 72 connected through a reference line 92 to the negative input terminal of the regulator 70. The voltage regulating unit 70 may be of any convenient type having a regulated D.C. output of the proper voltage for operating the transistors of the conditioning timing and heat control units. In the particular embodiment of the welding timer herein disclosed the regulator unit 70 impresses 18 volts on the positive potential line 118, such potential being positive with respect to the reference line 92.

(c) Synch generator 110

The lower end of the secondary winding 71 of the input transformer 11 is connected to one input terminal of the synch generator 110 (FIG. 4), the other input terminal of which is connected to the reference line 92. The synch generator 110 may be of any convenient type capable of generating a square wave output on the synch line 166 synchronized with the frequency of the power line feeding the input transformer 11. A potentiometer 165 has its ends connected between the positive potential line 118 and the synch line 166. The arm of the potentiometer 165 may be adjusted to vary the synch pulse amplitude appearing thereon for purposes appearing hereinafter.

(d) Conditioning unit 140

Figure 3:
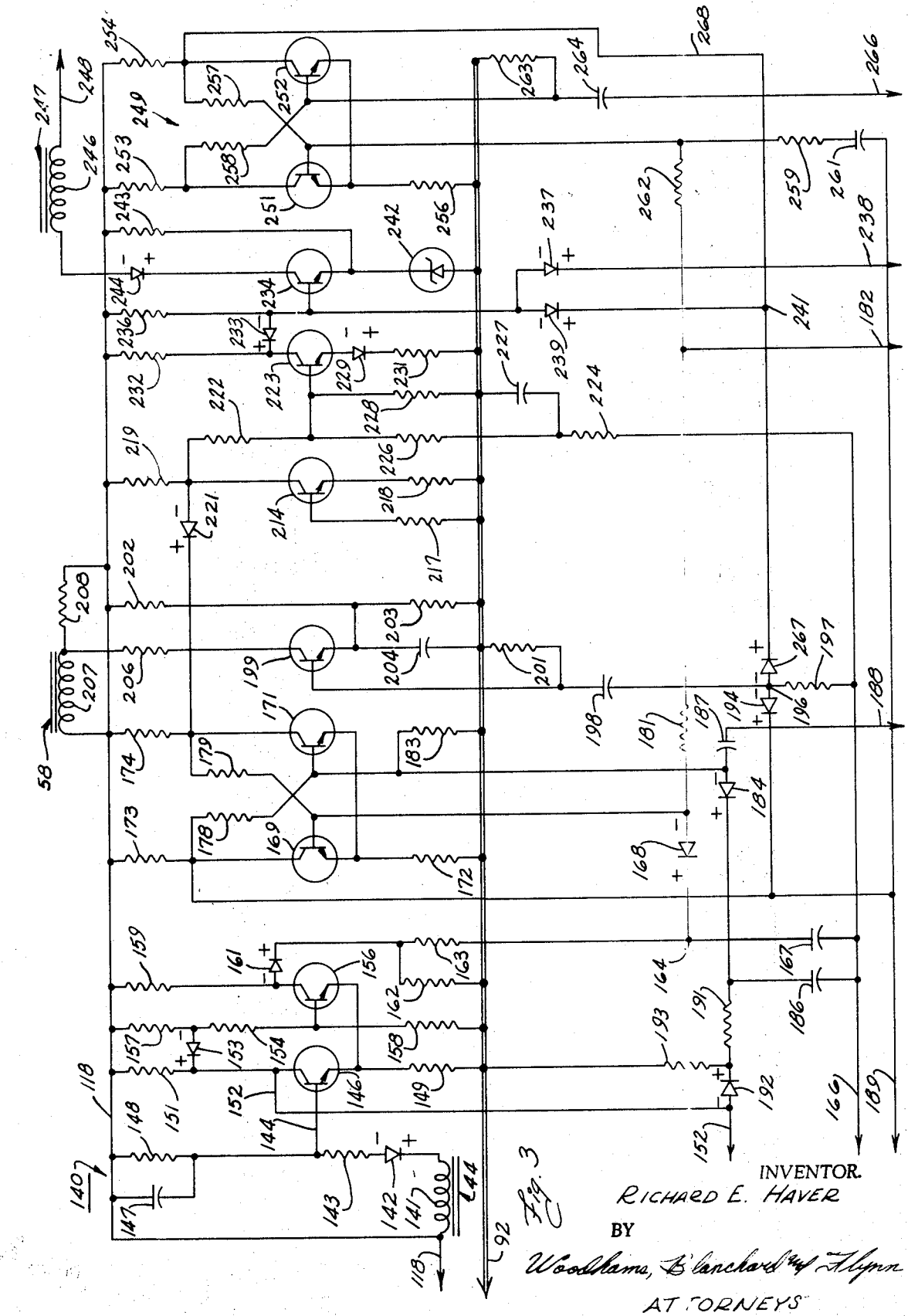
FIG. 3 is a schematic diagram of the conditioning unit of the welding timer.

Turning now to the conditioning unit (FIG. 3), the secondary winding 141 of the transformer 44 of the initiating unit 10 connects at one side thereof to the positive potential line 118 and the other side thereof through a negatively oriented diode 142 and dropping resistor 143 to the base 144 of the transistor 146. The base 144 also connects through a parallel capacitor 147 and resistor 148 to the positive potential line 118. The emitter of the transistor 146 connects through a resistor 149 to the reference line 92 and the collector thereof connects through a resistor 151 to the positive potential line 118. Said collector also connects to a line 152 for purposes appearing hereinafter and through a negatively oriented diode 153 and a bias resistor 154 to the base of a transistor 156. The anode of the diode 153 also connects through a biasing resistor 157 to the positive potential line 118.

The base of the transistor 156 connects through a bias resistor 158 to the reference line 92. The emitter of the transistor 156 connects to that of the transistor 146. The collector of the transistor 156 connects through a resistor 159 to the positive potential line 118. The transistors 146 and 156 act as two-state switches, the latter of which is controlled by the former and the former of which is controlled by the voltage appearing on the secondary winding 141.

The collector of the transistor 156 connects through a positively oriented diode 161 and resistance 162 to the reference line 92. The cathode of the diode 161 also connects through a resistance 163 to a junction point 164. The junction point 164 connects to the synch line 166 through a differentiating capacitor 167. The junction point 164 is connected through a negatively oriented diode 168 to the base of a transistor 169.

Transistors 169 and 171 comprise the switching elements of a bistable switch. A resistor 172 connects the emitters of the transistors 169 and 171 to the reference line 92 and resistors 173 and 174 connect the respective collectors of said transistors to the positive potential line 118. A resistor 178 connects the emitter of the transistor 169 with the base of the transistor 171 and a resistor 179 connects the collector of the transistor 171 with the base of the transistor 169 in a conventional manner. The base of the transistor 169 connects through a resistor 181 to a line 182 hereinafter described as the reset line 182. The base of the transistor 171 connects through bias resistor 183 to the reference line 92 and through a positively oriented diode 184 and a differentiating capacitor 186 to the synch line 166. The anode of the diode 184 is connected through a capacitor 187 to a line 188 for purposes appearing hereinafter. The cathode of the diode 184 connects through a resistor 191 and a negatively oriented diode 192 to the afore-mentioned line 152 and through the resistor 191 and a resistor 193 to the reference line 92. The collector of the transistor 169 connects to the timing unit 320 through the timer start line 189 whereby occurrence of a high potential on said collector, as when the transistor 169 falls nonconductive, acts as a starting signal for the timing unit 320. The collector of the transistor 169 also connects through a negatively oriented diode 194 to a junction point 196.

The synch line 166 connects through a resistance 197, the junction point 196, and a capacitor 198 to the base of a transistor 199, said base also being connected through a resistor 201 to the reference line 92. The emitter of the transistor 199 connects to the middle of the voltage divider comprising a high resistance 202 and a low resistance 203, said latter having a capacitor 204 in paralel therewith, which resistances are, respectively, connected to the positive potential line 118 and the reference line 92. The collector of the transistor 199 connects through a resistance 206 to the primary winding 207 of the afore-mentioned transformer 58 of the initiating unit 10 and through said resistance 206 and a dropping resistor 208 to the high potential line 118. The other end of the winding 207 is connected to the high potential line 118 also. Thus, when a high potential appears on the collector of the transistor 169 and therefore at the junction point 196, said high potential unblocks the synch pulses from the synch line 166 and allows same to render the transistor 199 intermittently conductive whereby a signal is impressed upon the windings of the transformer 58 for purposes appearing hereinafter.

A resistance 217 shunts the base of a transistor 214 to the reference line 92 and a further resistance 218 connects the emitter of the transistor 214 to the reference line 92. The collector of the transistor 214 connects through a resistance 219 to the positive potential line 118.

The collector of the afore-mentioned transistor 171 is connected through a negatively oriented diode 221 to the collector line of the transistor 214 and thence through a resistance 222 to the base of a transistor 223 whereby a high potential at the collector of the transistor 171 or at the collector of the transistor 214 will be placed on the base of the transistor 223 to tend to make same conductive. The synch line 166 is connected through resistances 224 and 226 to the base of the transistor 223 to further influence the conductivity of said transistor. A capacitor 227 connects said resistances to the reference line 92 and a resistance 228 connects the base of the transistor 223 to the reference line 92. The emitter of said transistor is connected through a positively oriented diode 229 and a resistance 231 to the reference line 92. The collector of the transistor 223 is connected through a resistance 232 to the high potential line 118 and is also connected through a negatively oriented diode 233 to the base of a transistor 234.

Figure 4:
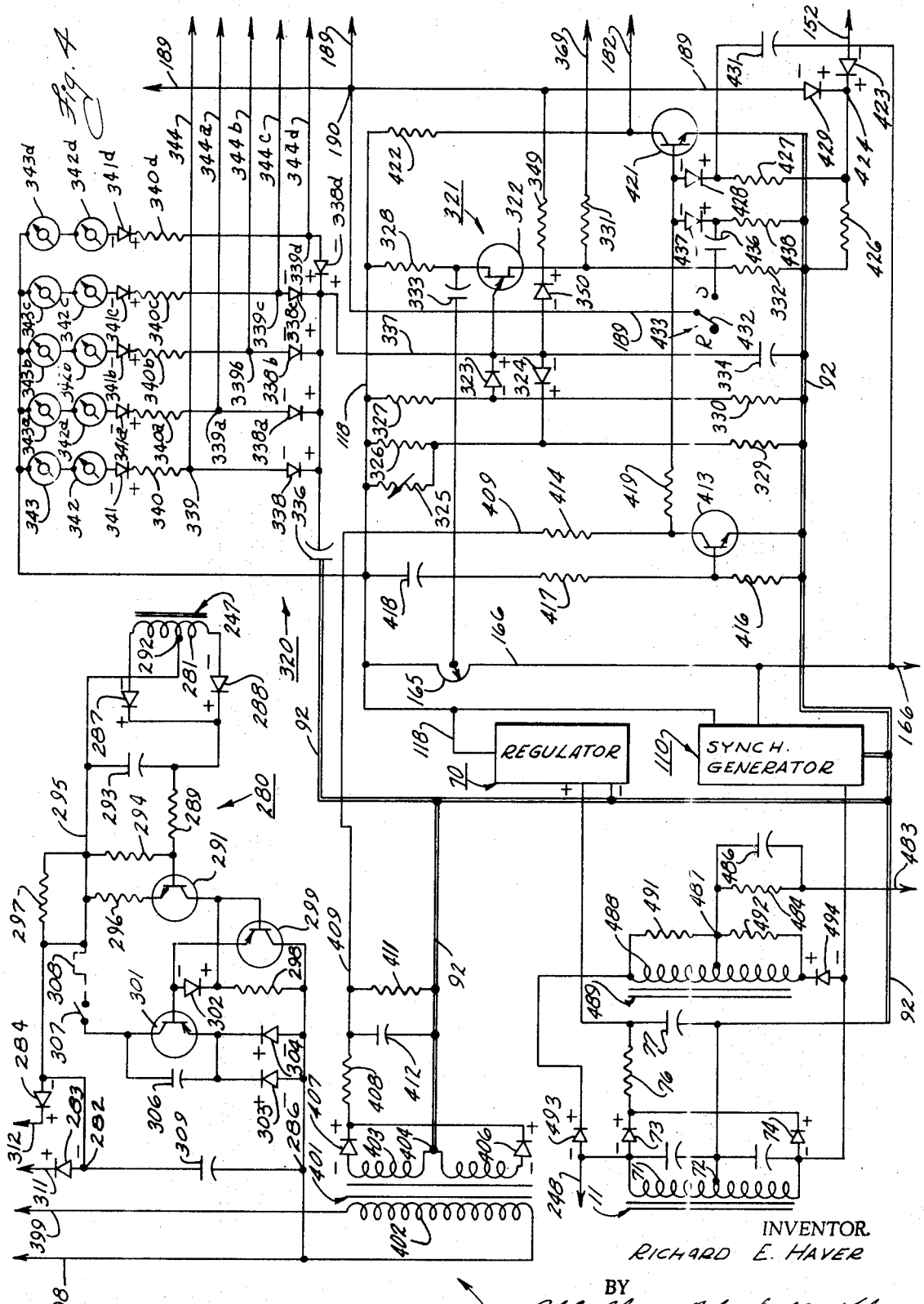
FIG. 4 is a schematic diagram showing the solenoid control unit, the regulator unit, the synchronizing unit and a part of a timing unit of the welding timer.

The base of the transistor 234 also connects through a resistance 236 to the high potential line 118, through a positively oriented diode 237 to a line 238 to be described hereinafter, and finally through a positively oriented diode 239 to a junction point 241. The emitter of the transistor 234 is connected through a negatively oriented Zener diode 242 to the reference line 92 and through a resistance 243 to the positive potential line 118. The collector of the transistor 234 connects through a negatively oriented diode 244 to one end of the primary winding 246 of a transformer 247. The other side of the primary winding 246 is connected through the line 248 to the upper end of the secondary winding 71 of the afore-mentioned transformer 11 (FIGS. 1 and 4). Hence, a potential applied to the base of the transistor 234 from the collector of the transistor 223, the junction point 241, or the line 238 will influence conduction thereof and thereby influence the signal of the primary 246 of the transformer 247 for purposes appearing hereinafter.

The conditioning unit 140 contains a second bistable switch 249 having transistors 251 and 252. The transistors 251 and 252 have respective collector resistors 253 and 254 to the positive potential line 118, a common emitter resistor 256 and respective base resistors 257 and 258 connected to the collectors of the opposite transistor in a manner similar to that of the above-mentioned bistable circuit incorporating the transistors 169 and 171. The base of the transistor 251 is connected through a series resistance 259 and capacitance 261 to the afore-mentioned line 189 and thus to the collector of the transistor 169. Said base is also connected through a resistance 262 to the afore-mentioned reset line 182. The base of the transistor 252 is connected through a resistance 263 to the reference line 92 and through a capacitor 264 to a line 266 for purposes appearing hereinafter. The collector of the transistor 252 is connected through the line 268 to the afore-mentioned junction point 241 and thence through a negatively oriented diode 267 to the afore-mentioned junction point 196 which is ultimately connected to the base of the transistor 199.

(e) Solenoid control unit 280

The solenoid control unit 280 (FIG. 4) is supplied with negative operating potential at the junction point 282 through a full-wave rectifier including the diodes 283 and 284 which are connected, respectively, to the lower end of the secondary winding 32 (FIG. 2) of the input transformer 11 and to the upper end of the secondary winding 12 of the input transformer 11 through the respective lines 311 and 312 (FIG. 4). The common connection of the aforementioned transformer windings 12 and 32 is connected through the line 398 to a positive supply point 286 to complete the power supply for the solenoid control unit 280. A capacitance 309 connects the points 282 and 286. The solenoid control unit 280 controls the opening and closing of the welding electrodes and is itself controlled by signals impressed upon the above-described transformer 247 of the conditioning unit 140 (FIG. 3) which has a secondary winding 281 in the solenoid control unit 280 (FIG. 4). The ends of the winding 281 are connected through a conventional full-wave rectifier comprising the diodes 287 and 288 to apply, when activated, a pulsating positive potential through a resistor 289 to the base of the transistor 291. The secondary winding 281 has a center tap 292 which is shunted to the output of the afore-mentioned full-wave rectifier by a capacitor 293 and which is connected through a negative supply line 295 and resistance 297 to the negative supply point 282. The negative supply line 295 connects through a resistance 294 to the base of the transistor 291 and also connects through a resistor 296 to the emitter of the transistor 291. The collector of the transistor 291 connects through a resistance 298 to the positive supply point 286 and also connects to the base of a transistor 299. The collector of the transistor 299 is connected to the positive supply point 286 and the emitter thereof is connected to the base of a PNP transistor 301.

The base of the transistor 301 also connects through a positively oriented diode 302 and the afore-mentioned resistor 298 to the positive supply point 286. The emitter of the transistor 301 is connected through a parallel pair of negatively oriented diodes 303 and 304 to the positive supply point 286 and through a capacitor 306 to the collector thereof. The collector of the transistor 301 is also connected through a set of contacts, 307, closed by the activation of the relay coil 39 in the initiating unit 10, through the winding of a solenoid 308 which controls the opening and closing of the welding electrodes hereinafter described, and to the negative supply point 282.

(f) Timing unit 320

The timing unit 320 (FIGS. 4 and 5) includes a starting circuit generally indicated at 321 (FIG. 4) which is substantially similar to that shown in application Ser. No. 257,175 now Pat. No. 3,253,157.

The circuit 321 includes a unijunction transistor 322 with an upper base connecting through a resistance 328 to the positive potential line 118 and through a differentiating capacitor 333 to the variable contact of the potentiometer 165 associated with the synch generator 110.

The provision of the potentiometer 165 was not included in the aforementioned application Ser. No. 257,175 (now Pat. No. 3,253,157) and allows the amplitude of synch pulses fed to the unijunction 322 to be adjusted whereby the firing point of the unijunction may be advanced or retarded from cycle to cycle and whereby reliable firing of the unijunction 322 at the desired point in the desired cycle is assured. The lower base of the unijunction 322 connects through a resistance 332 to the reference line 92 and through a resistance 331 to the line 369 which comprises the output line of the circuit 321. A parallel pair of voltage dividers lie between the power lines 92 and 118 and contain respective resistors 326, 329 and 327, 330. The former of these connects through a negatively oriented diode 324 to the emitter of the unijunction 322. The latter of said dividers connects through a positively oriented diode 323 to said emitter. Said emitter is fed through a line 337 from timing means hereinafter described and connects through a capacitor 334 to the reference line 92 and through a positively oriented diode 350 and resistance 349 to the line 189. The resistance 326 may be shunted, if desired, by a variable calibrating resistor 325.

Figure 5:
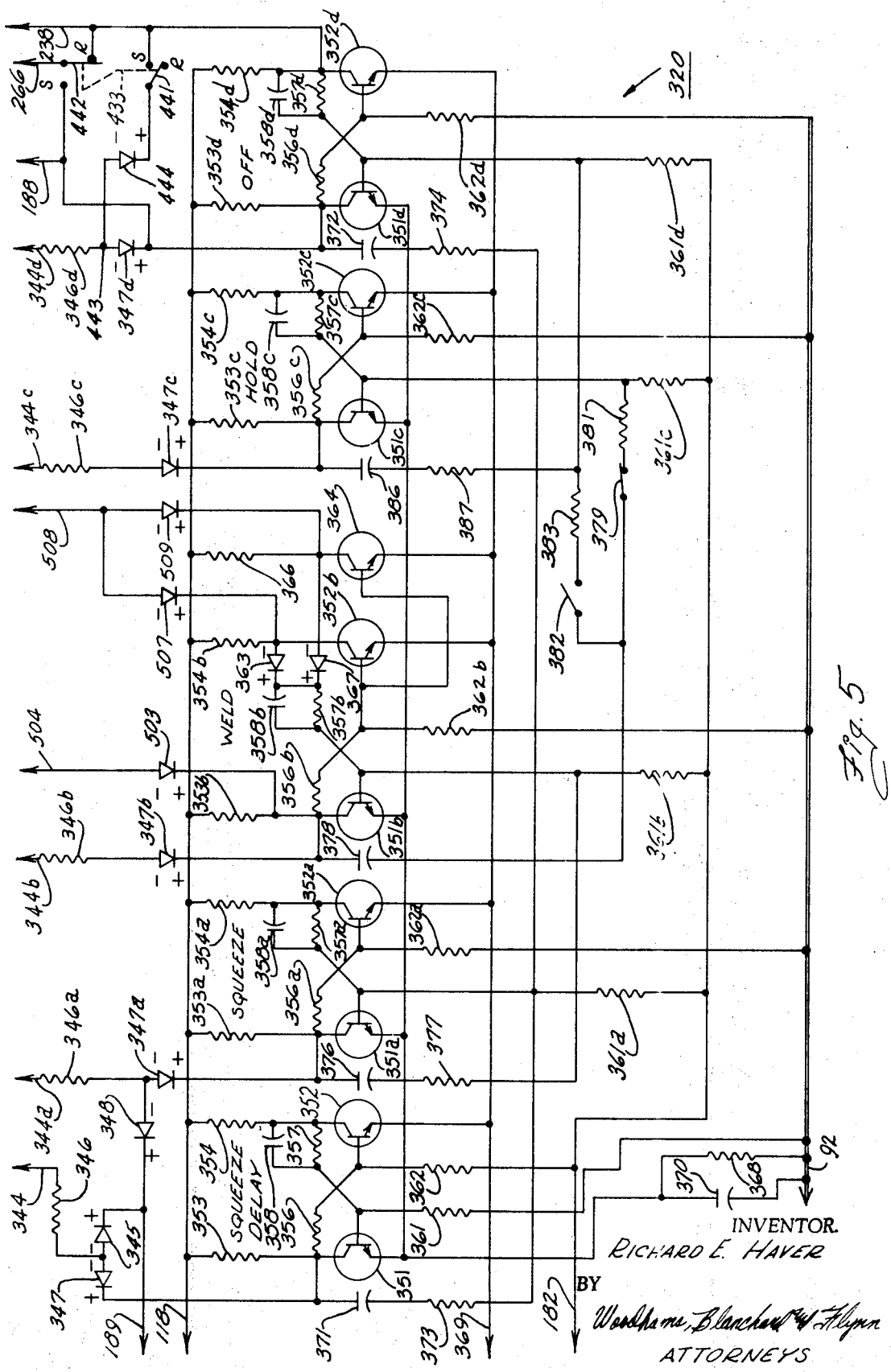
FIG. 5 is a schematic diagram of the bistable circuits of the timing unit of the welding timer.

However, several other connections to the starting circuit 321 (FIG. 4) differ slightly from comparable connections in the aforementioned application Ser. No. 275,175 (now Pat. No. 3,253,157), though not sufficiently to cause a difference in the internal operation of said circuit. The emitter of the unijunction transistor 322 connects through timing means comprising a timing capacitor 336 to the reference line 92. The emitter or rightward side of the capacitor 336 is also connected to one end of a parallel circuit (FIG. 4) having a plurality of legs therein each of which is associated with a bistable circuit of the timing unit 320 (FIG. 5). The other side of the parallel circuit is connected to the positive potential line 118 (FIG. 4). Since the legs of the parallel circuit are essentially identical, only one thereof will be described. Corresponding parts of the other legs will be numbered with the same reference numerals with the suffixes a, b, c and d attached thereto and will not be further described. Thus, considering the leftwardmost of the aforesaid legs, the rightward end of the capacitor 336 connects through a negatively oriented diode 338, a junction point 339, a resistance 340, a negatively oriented diode 341 and a series pair of resistance tap switches 342 and 343 to the positive potential line 118. The junction points 339–339d, inclusive, are, respectively, connected through the lines 344-344d, resistors 346–346d (FIG. 5), and positively oriented diodes 347–347d, to the collectors of the first transistors 351–351d of said bistable circuits. Hence, the device of the present application employs a single capacitor 336 for all of the separate timing intervals of the timing unit 320 whereas the afore-mentioned application Ser. No. 257,175 employs its timing capacitor for timing only a single interval.

The afore-mentioned line 189 from the collector of the transistor 169 in the conditioning unit 140 (FIG. 3) is connected through negatively oriented diodes 345 and 348 (FIG. 5) and through the afore-mentioned resistors 346 and 346a, respectively, to the junction points 339 and 339a, respectively. Line 189 is also connected through a resistance 349 and a negatively oriented diode 350 to the emitter of the unijunction transistor 322. Hence, the line 189 serves an analogous function to the switch 46 of the afore-mentioned application Ser. No. 257,175 (now Pat. No. 3,253,157).

The squeeze-delay, squeeze, weld, hold and off functions utilize basically similar bistable circuits (FIG. 5) of the type shown in the afore-mentioned application Ser. No. 257,175 (now Pat. No. 3,253,157) and interconnected essentially as a ring counter. Hence, the internal arrangement of only one of these circuits, for example, the squeeze-delay circuit will be described in detail for purposes of convenient reference and corresponding parts of the remaining circuits will be numbered with the same reference numerals with the suffixes a through d, respectively, attached thereto. The switching elements in the squeeze-delay circuit are a transistor 351 and a transistor 352. The emitters of the transistors 351 through 351d are connected through a common emitter resistor 368 having shunt capacitor 370 to the reference line 92 and the emitters of the transistors 352 through 352d are connected to a line 369 which in turn connects through the afore-mentioned resistance 331 from the lower base of the unijunction transistor 322 (FIG. 4). The transistors 351 and 352 have collector resistors 353 and 354 connected to the positive potential line 118. The collector of the transistor 351 is connected through a resistance 356 to the base of the transistor 352. The collector of the transistor 352 connects through a parallel resistance 357 and capacitance 358 to the base of the transistor 351. The base of the transistor 351 is also connected through a resistance 361 to the reference line 92. The base of the transistor 352 is connected through a resistance 362 to the afore-mentioned line 182 which is in turn connected to a reset unit hereinafter to be described. The remaining bistable circuits differ slightly in their internal connections from the squeeze-delay circuit hereinabove described in that the resistances 361a–361d are connected to the line 182 and the resistances 362a–362d are connected to the reference line 92. Furthermore, the weld bistable circuit differs slightly from the others in that a diode 363 is placed between the collector of the transistor 352b and the parallel R.C. circuit comprising elements 357b and 358d.

The weld bistable circuit also differs from the other bistable circuits in that the transistor 352b is backed up in case of failure thereof by an identical transistor 364 having its base and emitter connected to the base and emitter, respectively, of the transistor 352b, having its collector connected to the positive potential line 118 through a resistor 366 identical to the corresponding resistor 354b and having its collector also connected through a diode 367 to the R.C. circuit to which the diode 363 connects.

Turning now to the connections between the bistable circuits of the timing unit 320, the collector of the transistor 351 of the squeeze-delay circuit and the collector of the transistor 351d of the off circuit are connected through capacitors 371 and 372, respectively, and resistors 373 and 374, respectively, to the base of the transistor 351a of the squeeze circuit.

The collector of the transistor 351a of the squeeze circuit is connected through a capacitor 376 and resistance 377 to the base of the transistor 351b of the weld circuit. The collector of the transistor 351b of the weld circuit is connected through a capacitance 378, switch 379 operable by the relay 39 of the initiating unit 10 and resistance 381 to the base of the transistor 351c of the hold circuit and through the capacitance 378, switch 382 of the relay 39 and resistance 383 to the base of the transistor 351d of the off circuit. The collector of the transistor 351c of the hold circuit is connected through a capacitance 386 and resistance 387 to the base of the transistor 351d of the off circuit.

(g) Reset unit 400

The reset unit 400 (FIG. 4) is supplied with power from a transformer 401, the primary 402 of which is connected across the secondary 32 of the transformer 11 and shut-off switch 34 of the initiating unit 10 through the lines 398 and 399. The secondary 403 of the transformer 401 has a center tap 404 connected to the reference line 92 and has the ends thereof connected through a conventional full-wave rectifier comprising the diodes 406 and 407 and through a resistor 408 for supplying a positive D.C. voltage to a line 409. The line 409 connects to the reference line 92 through a parallel resistance 411 and capacitance 412 for smoothing the output of the afore-mentioned full-wave rectifier.

The reset unit 400 has a first transistor 413 having its emitter connected to the reference line 92 and its collector connected through the resistance 414 to the afore-mentioned supply line 409 from the transformer 401. The base of the transistor 413 is connected through a biasing resistor 416 to the reference line 92 and through an input resistance 417 and capacitor 418 to the positive potential line 118 from the regulator unit 70. The collector of the transistor 413 is connected through an output resistance 419 to the base of a second transistor 421.

The emitter of the transistor 421 connects to the reference line 92 and the collector thereof connects through a resistor 422 to the positive potential line 118. The afore-mentioned line 152 from the collector of the transistor 169 of the conditioning unit 140 (FIG. 3) is connected through a positively oriented diode 423 (FIG. 4) to a junction point 424. The junction point 424 is connected through a resistance 426 to the reference line 92 and through a resistance 427 and a negatively oriented diode 428 to the base of the transistor 421. The afore-mentioned line 189 from the collector of the transistor 169 of the conditioning unit 140 is connected through a positively oriented diode 429 to the junction point 424 and hence in the above-mentioned manner to the base of the transistor 421. The output line 166 of the synch generator 110 is connected through a capacitance 431 and through the afore-mentioned diode 428 at the base of the transistor 421. The line 189 is also connected to the common terminal of a set of contacts 432 of a repeat-single switch 433. The "repeat" contact R of said contacts 432 is unused and the "single" contact thereof connects through a capacitance 436 and a negatively oriented diode 437 to the base of the transistor 421. The base of the transistor 421 is also connected through the afore-mentioned diode 437 and a resistance 438 to the reference line 92 for biasing said base. Hence, signals are impressed upon the base of the transistor 421 from the transistor 413, the synch generator 110 and the collectors of the transistors 146 and 169 of the conditioning unit 140. Furthermore, by switching the repeat-single switch 433 to its "single" positions, the collector of the afore-mentioned transistor 169 connects therethrough by a second path to the base of the transistor 421. The output of the transistor 421 is taken from the collector thereof and applied to the aforementioned line 182 whereby it is applied to the bases of various transistors of the bistable circuits (FIG. 5) of the timing unit 320 as hereinabove described.

The repeat-single switch 433 has further sets of contacts 441 and 442 (FIG. 5). When the switch 433 is in its "single" position the set of contacts 442 connects the collector of the transistor 351d of the off bistable circuit of the timing unit 320 through the afore-mentioned line 266 to the conditioning unit 140. The collector of the transistor 351d is also connected through the afore-mentioned line 188 to the conditioning unit 140. Also, when the switch 433 is in its "single" positions, the collector of the transistor 352d connects through the contacts 441 and diode 444 to the junction point 443 between the afore-mentioned resistance 346d and diode 347d. Said collector is also connected through the afore-mentioned line 238 to the conditioning unit 140.

When the switch 433 is in its "repeat" position R the contacts 442 thereof connect the collector of the transistor 352d to the line 266 and the contacts 441 thereof are open.

(h) Heat control unit 450

Figure 6:
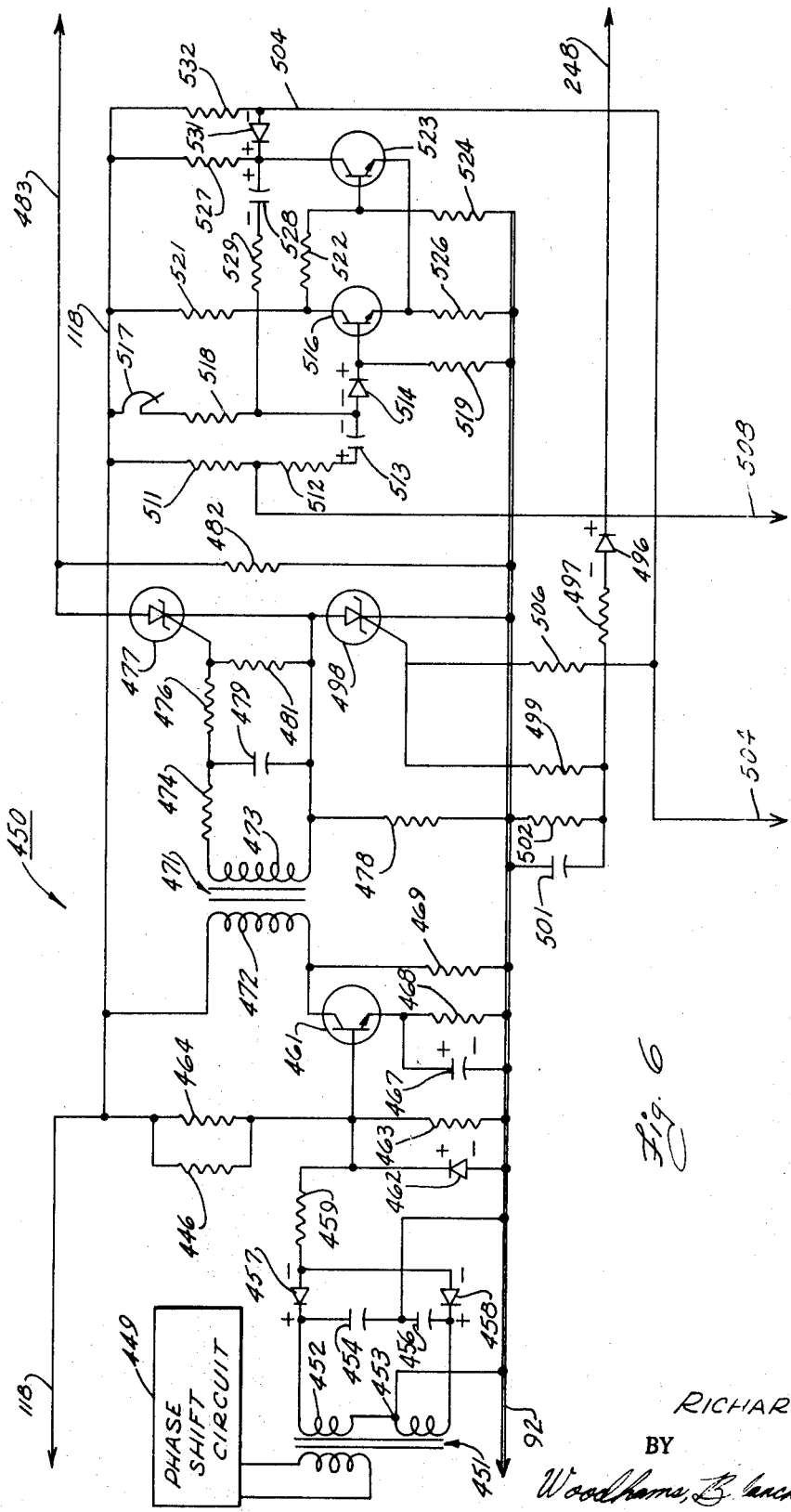
FIG. 6 is a schematic diagram of the heat control unit of the welding timer.

The transformer 451 (FIG. 6) is the output transformer of a conventional phase-shift circuit 449 and has a center tapped secondary winding 452. The center tap 453 thereof is connected to the reference line 92 and through capacitors 454 and 456 to the ends of said secondary winding 452. A conventional full-wave rectifier, comprising diodes 457 and 458, is connected from the ends of the secondary 452 through a resistor 459 to the base of a transistor 461 and supplies a series of negative pulses thereto. The base of the transistor 461 is also connected through a negatively oriented diode 462 to the reference line 92 and to the center of a voltage divider comprising a resistor 463 to the reference line 92 and parallel resistors 464 and 466 to the positive potential line 118.

Thus, a constant positive potential is impressed from the positive potential line 118 upon the negative pulsating signal from the transformer 451 whereby the base of the transistor 461 is in effect fed a positive pulsating signal having relatively sharp pulses. The emitter of the transistor 461 is connected through a capacitor 467 and resistor 468 to the reference line 92. The collector of the transistor 461 is connected through a relatively high resistance 469 to the reference line 92 and through the primary winding 471 of a transformer 472 to the positive potential line 118.

The secondary winding 473 of the transformer 471 is connected at one end thereof through series connected resistances 474 and 476 to the gate of an S.C.R. 477. The other end of the secondary winding 473 is connected to the cathode of the S.C.R. 477 and through a resistance 478 to the reference line 92. A capacitance 479 is connected across the secondary winding 473 and resistance 474 and a resistance 481 is connected across the gate and cathode of the S.C.R. 477. Hence, the phase-shift signal appearing on the transformer 471 is impressed upon the gate of the S.C.R. 477 for controlling the conduction thereof. The anode of the S.C.R. 477 is connected through a relatively high resistance 482 to the reference line 92 and also to a line 483.

The line 483 connects through a parallel resistance 484 and capacitance 486 (FIG. 4) to the center tap 487 of the primary winding 488 of a transformer 489. The ends of the primary winding 488 are connected to the center tap 487 thereof by resistors 491 and 492. The ends of the secondary winding 71 of the transformer 11 hereinabove described connect through positively oriented diodes 493 and 494 to the ends of the primary winding 488 of the transformer 499. Thus, a positive voltage is supplied to alternate ends of the primary winding 488 during alternate half cycles of current through the transformer 11. However, current flow through either half of the primary winding 488 depends on completion of the circuit through the center tap 487 thereof to the reference line 92 as hereinafter described.

The line 248 from the upper end of the secondary winding 71 of the input transformer 11 connects to the primary winding 246 of the transformer 247 of the conditioning unit 140 (FIG. 3) and also connects through a negatively oriented diode 496 (FIG. 6) and series resistances 497 and 499 to the gate of an S.C.R. 498. The cathode of the S.C.R. 498 is connected to the reference line 92 and the anode thereof is connected to the cathode of the S.C.R. 477.

A capacitance 501, shunted by a resistance 502, connects the reference line 92 to a junction point between the afore-mentioned resistors 497 and 499. The collector of the transistor 351b of the weld bistable circuit is connected through a negatively oriented diode 503, a line 504 (FIGS. 3 and 6) and a resistance 506 (FIG. 6) to the gate of the S.C.R. 498. Hence, the gate of the S.C.R. 498 is controlled by the input transformer 11 and by the weld bistable circuit. Conduction of both the S.C.R.'s 498 and 477 will bring the center tap 487 (FIG. 4) of the transformer 489 to ground potential whereby the impression of a voltage on the secondary winding 488 thereof will result in current flow therethrough and thus will result in a signal in the secondary windings of the transformer 489 as hereinafter described.

The collector of the transistor 352b of the weld bistable circuit (FIG. 5) is connected through a negatively oriented diode 507 to a line 508. The collector of the back-up transistor 364 is similarly connected through the negatively oriented diode 509 to the line 508. The line 508 connects to the heat control unit 450 (FIG. 6) at a point between a resistance 511 to the positive potential line 118 and a series circuit comprising a resistance 512, capacitor 513 and positively oriented diode 514 connected to the base of a transistor 516. The positive potential line 118 also connects through a potentiometer 517, resistor 518 and the afore-mentioned diode 514 to the base of the transistor 516. Said base is further connected through a resistor 519 to the reference line 92. The collector of the transistor 516 is supplied with operating potential from the positive potential line 118 through a resistor 521 and in turn supplies a signal through a resistor 522 to the base of a further transistor 523, said base also being connected to the reference line 92 through a biasing resistor 524. The emitters of the transistors 516 and 523 are connected through common biasing resistor 526 to the reference line 92. The collector of the transistor 523 is supplied with operating potential through a bias resistor 527 connected to the positive potential line 118. Said collector also connects through a chargeable capacitor 528, resistor 529 and the afore-mentioned diode 514 to the base of the transistor 516. Said collector further connects through a negatively oriented diode 531 to the line 504 and hence eventually to the gate of the S.C.R. 498. The anode of the diode 531 is connected through a resistance 532 to the positive potential line 118.

(i) Firing circuit 540

The firing circuit 540 (FIG. 2) includes a pair of thyratrons 541 and 542 controlling the firing of a pair of ignitrons 543 and 544. The ignitrons 543 and 544 control the current flow through a welding transformer 546 and hence through welding electrodes 547. Current is supplied to the welding transformer 546 from any convenient source, not shown, by the lines 548 and 549.

A firing circuit transformer 552 has its primary winding 551 connected across the secondary winding 12 of the input transformer 11 and has a pair of secondary windings 553 and 553a which, through identical networks generally indicated at 554 and 554a, control the grid bias on the respective thyratrons 541 and 542. The network 554 comprises the resistances 556 through 560, the capacitances 62 and 63 and the diode 564. Since the networks 554 and 554a are identical the reference numerals applied to parts of the network 554 will, with the suffix "a" added thereto, apply to corresponding elements of the network 554a. The network 554a will not be further described. Secondary windings 566 and 566a of the transformer 489 of the heat control circuit 450 (FIG. 2) are connected across the resistors 559 and 559a hereinabove described. Thus, the transformer 489 impresses a series of pulses on alternate ones of the grids of the thyratrons 541 and 542, said pulses being shifted in phase from the signal impressed on said grids by the firing circuit transformer 552.

The anodes of the thyratrons 541 and 542 are connected through the contacts 567 and 568 of the relay 39, respectively, to the anodes of the ignitrons 543 and 544, respectively. The ignitors of the ignitrons 543 and 544 are connected, respectively, to the cathodes of the thyratrons 541 and 542. The anodes of each of the ignitrons 543 and 544 are connected to the cathodes of the other of the ignitrons 543 and 544. The anode of the ignitron 543 is connected through the welding transformer 546 to the line 548 and the anode of the ignitron 544 is connected to the line 549.

OPERATION

Upon energization of the input transformer 11 by a source of alternating potential, not shown, the secondary winding 71 (FIG. 4) thereof and the diodes 73 and 74 supply a D.C. voltage through the filter comprising the resistance 76 and capacitance 77 to the voltage regulator 70. The regulator 70 provides a constant D.C. voltage between the positive potential line 118 and the reference line 92 for operation of various of the circuits of the timer.

Figure 7:
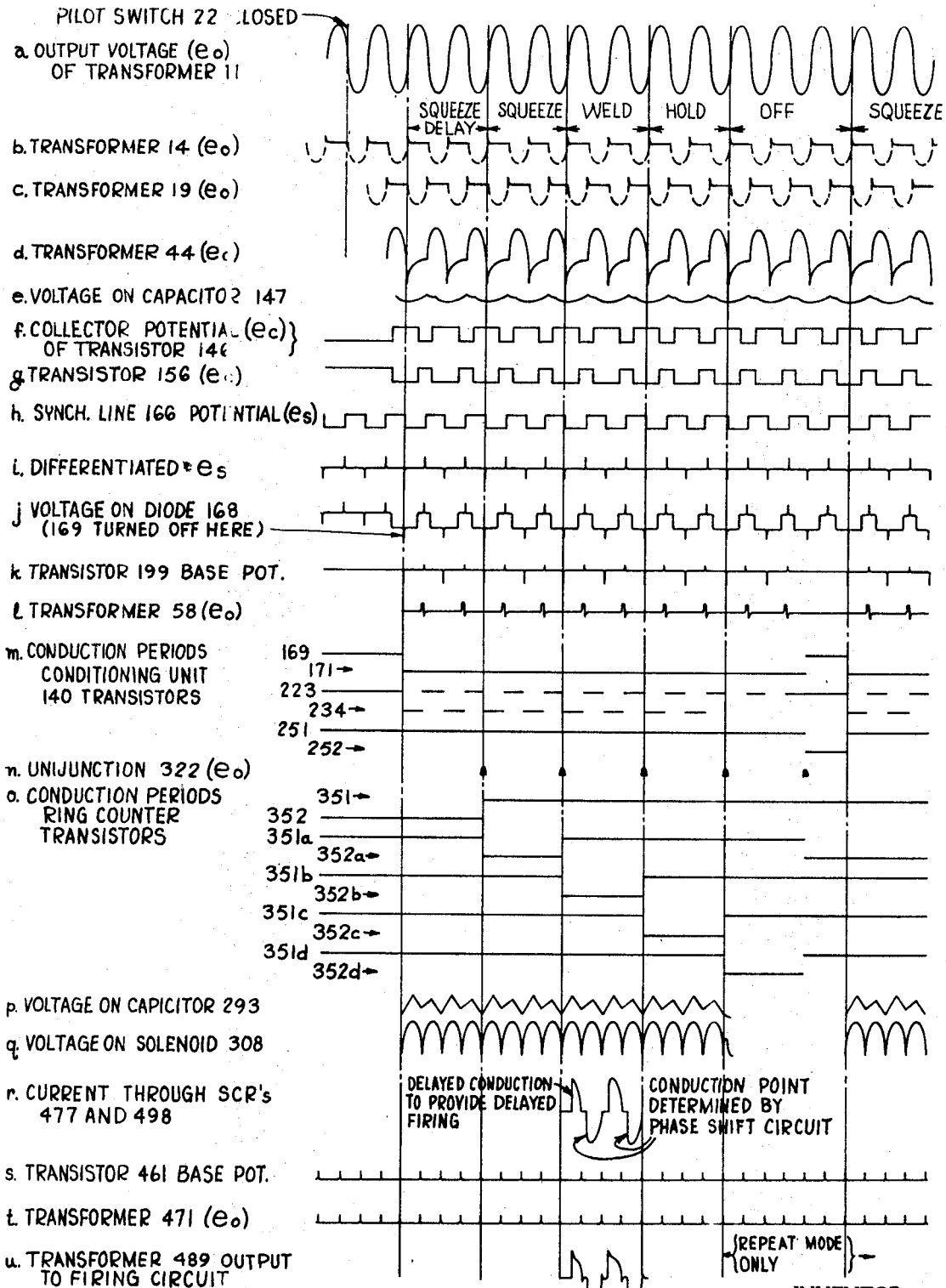
FIG. 7 is a diagram of voltage wave forms occurring in the welding timer.

The synch generator 110 is simultaneously supplied with an alternating voltage from one leg of the secondary 71 to produce a square wave output shown in FIG. 7–h which is in synchronization with the output of the transformer 11.

The reset circuit 400 also is immediately energized. The secondary 32 (FIG. 2) of the input transformer 11 supplies the transformer 401 (FIG. 4) through the lines 398 and 399. The transformer 401, rectifiers 406 and 407 and filter elements 408 and 412 supply a D.C. voltage between the positive line 409 and reference line 92 to the anode and cathode, respectively, of the initial transistor 413 of said reset circuit 400. The initial build-up of voltage from the regular 70 acts through the capacitor 418 to fire the transistor 413. The collector potential of said transistor 413 then drops the base potential of the reset transistor 421 and thereby turns same off. The collector potential of the reset transistor 421 then rises to place a positive signal on the reset line 182 thereby insuring that the bistable circuits of the timer are in their proper initial condition. The capacitor 418 soon charges and turns off transistor 413 which turns on reset transistor 421 to drop the potential on the reset line 182. This ends the first reset pulse and the bistable circuits remain in their proper initial condition.

The synch signal from the synch generator 110 passes along the line 166 to the capacitor 431 which differentiates the square-wave synch signal to obtain alternating positive and negative voltage spike pulses (FIG. 7–i). The diode 428 impresses the negative spike pulses on the base of the normally conductive reset transistor 421 to extinguish same and thereby furnish the reset line 182 with one positive reset pulse every source cycle as long as the lines 152 and 189 are both at a low potential, i.e., as long as the transistors 146 and 169 are continuously conducting. When the initiating unit 10 starts the conditioning unit 140 (FIG. 3) as described hereinbelow in detail, it will be seen that the transistors 146 and 169 no longer conduct during the occurrence of negative synch spikes whereby their high collector potentials are applied through diodes 423 and 429 (FIG. 4), respectively, to block the synch spikes and hence prevent the occurrence of reset pulses.

The diode 350 and resistance 349 prevent charging of the capacitor 336 beyond the minimum level defined by voltage divider resistances 327 and 330 while transistor 169 (FIG. 3) is conducting. The ratio of resistance 172 to resistance 173 is calibrated to prevent the capacitor 336 from charging to a voltage greater than that determined by the resistors 330 and 327. Conduction of transistor 169 prevents the capacitor 336 from charging through the leakage resistance between the emitter and upper base of the unijunction 322. This charging could otherwise occur during long "at rest" periods and leave the unjunction poised to conduct almost immediately upon starting of the timing unit 320 regardless of the required length of the first timed interval.

(a) Initiating unit

Assuming the lines 548 and 549 (FIG. 2) of the firing circuit 540 and the input transformer 11 of the initiating unit 10 to be connected to suitable sources of alternating voltage, operation of the welding timer embodying the invention commences with the closure of the pilot switch 22 (FIG. 2) which allows the secondary winding 12 of the input transformer 11 to place through the diode 21, positive half cycles of the alternating input potential (FIG. 7a) on the anode of the S.C.R. 17. The secondary winding 12 (FIG. 2) also impresses an alternating voltage on the series circuit comprising the diode 15 and the primary winding 13 of the transformer 14. The diode 15 allows only negative half cycles to be impressed on the primary 13. However, the collapse of the field in the transformer 14 is such that a positive kick pulse (FIG. 7b) also appears in the secondary 23 of the transformer 14. The peak of the reactive kick is precisely locatable in time with respect to the input wave form appearing in the input transformer 10 and is characteristic of the transformer 14 employed. In this particular embodiment, the kick pulse is relatively narrow and its peak occurs at the zero degree point of the input sine wave. The diode 24 blocks the negative half cycles of the wave form and applies only the positive reactive kick pulses to the gate of the S.C.R. 17. Since the kick pulse occurs at the beginning of the positive half wave applied to the anode of the S.C.R. 17, said S.C.R. 17 will begin conducting through the primary winding 18 of the transformer 19 and will continue to conduct for the remainder of the positive half cycle of voltage applied thereacross. Thus, in this embodiment, the S.C.R. 17 must conduit for entire half cycles or not at all. Since the pulse triggering the S.C.R. 17 is over with before the alternating potential source has climbed very much beyond the zero voltage point, the terminals of the pilot switch 22 must be almost completely shorted before sufficient anode potential can be applied to S.C.R. 17 to allow triggering thereof by said pulse. Thus, false starts due to foreign objects in the pilot switch contacts, such as when said switch is a foot-operated, floor-mounted type, are largely avoided.

The collapse of the field in the transformer 19 at the end of said positive half cycle causes another reactive kick pulse to be formed. The secondary winding 51 of the transformer 19 inverts the polarity of the above-described voltage and applies same through the rectifier 54 to apply a now positive reactive kick pulse (FIG. 7–c) on the gate of the S.C.R. 46. At this time, a positive potential is applied to the anode of the S.C.R. 46 from the secondary 32 of the transformer 11 through the closed shut-off switch 34, diode 36 and network 37. The cathode of the S.C.R. 46 is connected through the diode 64 and pilot switch 22 to the now negative remaining end of the secondary 32 whereby a potential is applied across the S.C.R. 46. The S.C.R. 46 now conducts due to the reactive kick pulse generated by the transformer 19. Thus, the point at which conduction occurs in the S.C.R. 46 is precisely locatable with respect to the input wave form in the input transformer 11 and is, in this particular embodiment, 180 degrees later than the beginning of conduction of the S.C.R. 17. Consequently, conduction of the S.C.R. 46 is delayed until at least one-half cycle of the power supply after the closure of the pilot switch 22. This delay, along with the necessity of maintaining the contacts of the pilot switch closed during said delay greatly reduces the chance of random initiation of the timer.

Conduction of the S.C.R. 46 takes place for full half cycles (FIG. 7–d) and energizes the winding of the relay 39 which closes its contacts 47, 307, 567 and 568. Closure of the contact 47 shunts the pilot switch 22 to allow said switch to be opened without disabling the S.C.R. 46. However, opening the pilot switch 22 disconnects the cathode of the S.C.R. 17 from the input transformer 11. The cathode of the S.C.R. 17 cannot conduct through the closed contacts 47 because of the blocking diode 64. Hence, the S.C.R. 17 is restrained from further activity. The contacts 307, 567 and 568 of the relay 39 are safety provisions opened by the opening of the safety switch 34 and the consequent de-energization of the S.C.R. 46 and hence the relay 39.

(b) Conditioning unit

Conduction of the S.C.R. 46 also energizes the primary winding 43 of the transformer 44 and hence the secondary 141 (FIG. 3) thereof which provides a starting pulse for the conditioning unit 140. Briefly, then, the conditioning unit 140 feeds back to the secondary winding 57 of the transformer 58 (FIG. 2) a pulse which controls the gate of the S.C.R. 46 for keeping same conductive in the above-described manner. The pulse arriving on the secondary 57 does not involve the reactive kick mode of operation set forth hereinabove with respect to transformer 19, but instead consists of a small pulse generated within the conditioning unit 140 and appearing in the same relative location in the supply wave form as the reactive kick pulse from the transformer 19 above described.

More specifically, the potential appearing on the lower terminal of the secondary winding 141 of the transformer 44 consists of a series of spaced negative half cycles. Any positive pulses appearing between said negative half cycles are blocked by the diode 142 which passes said negative half cycles to charge the capacitor 147 in the manner indicated in FIG. 7–e.

The capacitor 147 thus applies a negative voltage to the base of the normally conductive transistor 146 to turn same off. Thereafter, said transistor 146 is maintained off except for a short period surrounding the start of every negative half cycle from the diode 142 and during which the capacitor 147 applies a positive voltage to said base. The high collector potential of the transistor 146 due to its periodic nonconductivity is applied through the line 152, diode 423 (FIG. 4) and resistance 427 to the cathode of the diode 428. Said high potential is present when the negative spike due to the synch signal from the line 166 appears and said high potential cancels said spike. Thus, the reset transistor 421 continues to conduct and no longer presents reset pulses to line 182.

Cessation of conduction by the transistor 146 (FIG. 3) raises its collector potential and therefore raises the potential of the base of the normally nonconductive transistor 156 to turn same on. Similarly, conduction by transistor 146 renders transistor 156 nonconductive. Thus, the transistor 156 will conduct intermittently for a relatively large part of each of the following cycles as indicated in FIG. 7–g.

The transistor 169 is conducting at this point as shown in FIG. 7–m, such conduction being assured by the afore-mentioned initial reset pulse placed on line 182 upon supplying current to the input transformer 11. With the transistor 156 in its original nonconductive condition, the high potential on the collector thereof is applied through the diode 161, resistance 163 and junction point 164 to the cathode of the diode 168. The synch signal from the synch line 166 is differentiated by the capacitor 167 and the resultant signal (FIG. 7–i) is applied to the cathode of the diode 168 which could allow the negative spikes through except for the high voltage block from the transistor 156. Thus, no negative spikes reach the base of the transistor 169 and same remains conductive. However, the drop in collector potential in the transistor 156 caused by the transistor 146 unblocks the diode 168 whereby negative synch spikes will render the transistor 169 intermittently nonconductive. The composite signal applied to the cathode of diode 168 is shown in FIG. 7–j. Hence, the next fall in potential appearing in the synch line 166 after conduction of the transistor 156 will shut off the transistor 169 whereby a high potential will appear on its collector and will be applied through the line 189 to the timing unit 320 to start same. Thus, the starting time of the timing unit 320 is precisely known with respect to the voltage phase in the input transformer 11 and lines 548 and 549 because said starting time is keyed to the synch generator 110. Said starting time is therefore not affected by phase drift in the initiating unit 10 or in the circuitry of the conditioning unit 140 preceding the transistor 169.

Figure 2:
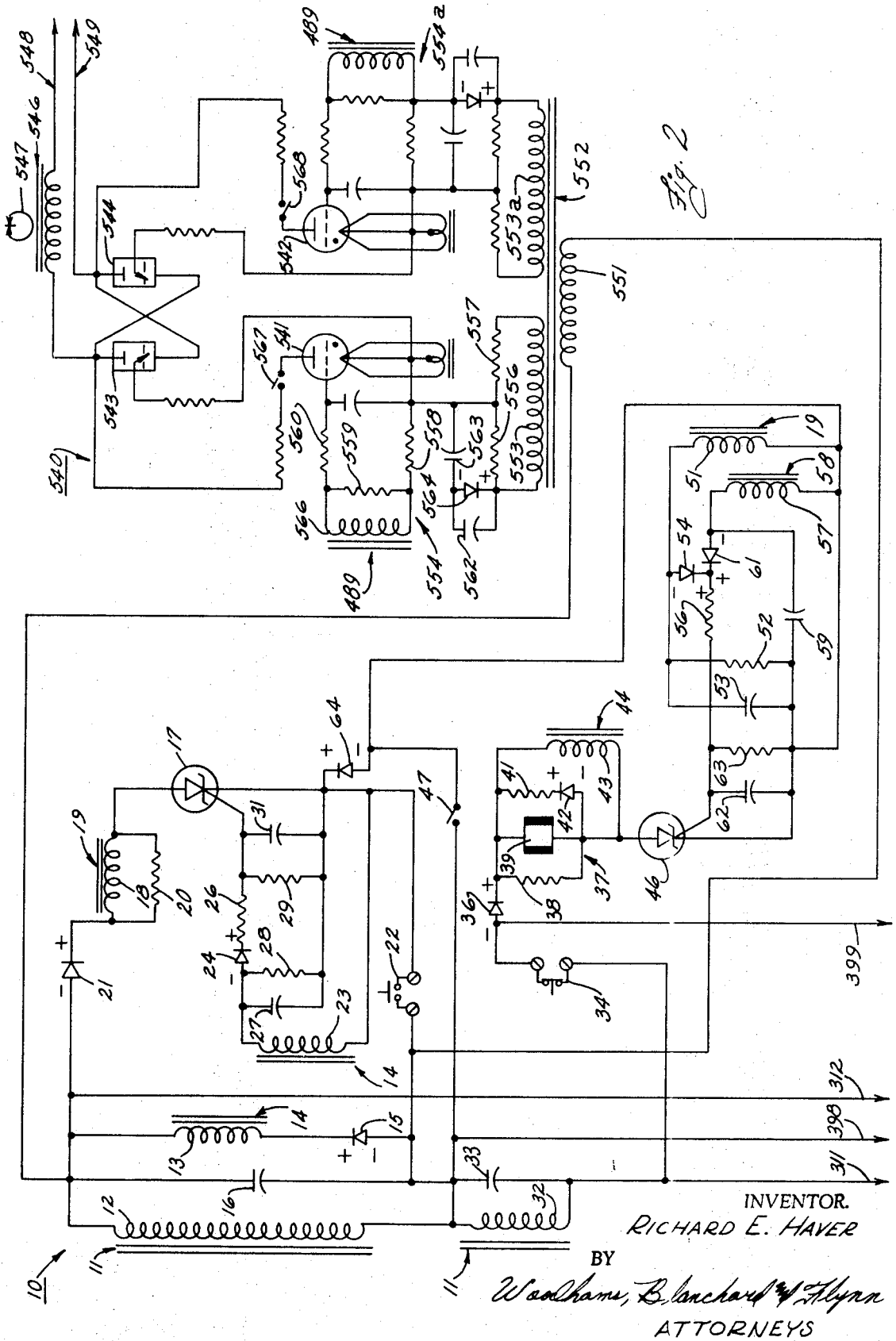
FIG. 2 is a schematic diagram of the initiaing and firing units of the welding timer.

The afore-mentioned high potential on the collector of the transistor 169 is also applied to the cathode of the diode 194 to block said diode from shorting out positive going synch signals from the resistance 197. Thus, such synch signals may now be differentiated by the capacitor 198 to apply positive voltage spikes to the base of the normally nonconductive transistor 199 as seen in FIG. 7–k and thereby render the transistor 199 intermittently conductive through the primary winding 207 of the transformer 58. The output wave form of the transformer 58 is shown in FIG. 7–l and is in phase with the output of transformer 19 (FIG. 2). The secondary winding 57 of the transformer 58 now controls the S.C.R. 46 in the initiating unit 10 and maintains operation thereof after the transformer 19 becomes inactive due to the above-described release of the pilot switch 22 and the consequent shut down of S.C.R. 17.

The high potential on the collector of the transistor 169 is also applied through the resistor 178 to the base of the transistor 171 to turn same on and to drop the collector potential thereof. The transistors 146, 156, 169 and 171 may be considered the initial memory circuit of the conditioning unit 140 for convenience in reference.

The transistor 214 normally is nonconductive and applies a high potential to the base of the transistor 223 to maintain same normally continuously conductive despite the negative portions of the synch signal placed on said base by the synch line 166. In the particular embodiment shown, the transistor 214 remains off during the operation of the circuit. In other embodiments, other means, not shown, may have been connected to the base thereof to turn same on thereby dropping the base potential of the transistor 223 sufficiently that negative synch pulses can render same nonconductive. The transistor 214 is here included then to indicate the possibility of such additional control on the transistor 223. When such additional control is not required, the transistor 214, as well as the resistances 217 and 218, may be omitted without affecting the following description.

As mentioned hereinabove in connection with the description of the operation of the transistor 171, the appearance of a signal on the transformer 44 ultimately causes the turning on of the normally nonconductive transistor 171 whereby the collector potential thereof falls. This potential drop is carried through the diode 221 and the resistor 222 to the base of the transistor 223 to drop potential thereof whereby the synch pulses from the line 166 render the transistor 223 intermittently conductive.

The transistor 234 is normally off as shown in FIG. 7–m because its emitter potential is raised above ground by the potential drop across the Zener diode 242 which, with the resistor 243, is connected between the reference line 92 and the positive potential line 118. Hence, the potential drop across the transistor 234 is insufficient to cause conduction thereof with the bias normally existing on the base thereof. When the transistor 223 is in a nonconductive part of its intermittent conduction cycle hereinabove described, a high potential will appear on the collector thereof and hence on the base of the transistor 234 which will be sufficient to cause the transistor 234 to conduct. The transistor 234 therefore conducts in an intermittent manner whenever the intermittently conducting transistor 223 is off. Conduction of the transistor 234 causes a signal to appear in the secondary winding 246 of the transformer 247 and therefore in the secondary winding 281 (FIG. 4) thereof which controls the action of the solenoid control unit 280 hereinafter discussed.

Referring to the bistable circuit 249, conduction of the transistor 251 thereof is assured with or just after the energization of the input transformer by the afore-mentioned initial reset pulse which is applied by the line 182 to the base of said transistor 251. Thus, the transistor 252 will be nonconductive and have high collector potential which is applied through the line 268 to the cathodes of the diodes 239 and 267. Hence, said diodes will not drain off the positive voltages impressed on the bases of transistors 199 and 234 and operation of said transistors will proceed as stated above.

(c) Solenoid control unit

Energization of the transformer 247 by the above-mentioned intermittent conduction of the transistor 234 energizes the secondary winding 281 (FIG. 4) of said transformer 247 to apply a pulsating D.C. voltage across the capacitor 293 (FIG. 7–p). Said voltage turns on the transistor 291 which in turn shuts off the normally conductive transistor 299. Thus, the transistor 299 no longer acts as a short circuit between the base and emitter of the PNP transistor 301 for maintaining same nonconductive. Furthermore, the conductivity of the transistor 291 causes a voltage drop across the resistance 298 which lowers the potential on the base of the PNP transistor 301 sufficiently to allow conduction (FIG. 7–p) thereof through the solenoid 308 to close the welding electrodes.

Later in the sequence of the timer and as described hereinafter, the transistor 234 will be rendered nonconductive for more than a half cycle of the supply voltage and will no longer energize the transformer 247. De-energization of the transformer 247 causes the transistors 291 and 301 to cease conduction which de-energizes the solenoid 308 to separate the welding electrodes. Concurrently, the transistor 299 is turned on to short the base and emitter of the transistor 301 to maintain same off despite ambient heating effects.

(d) Timing unit—squeeze-delay, squeeze and weld intervals

The starting section 321 (FIG. 4) of the timing unit 320 is substantially similar to that of the afore-mentioned application Ser. No. 257,175 (now Pat. No. 3,253,157). Hence, only a brief description of the operation of the starting section 321 will be given here.

In the particular embodiment of the invention described, the sequence of the timing unit 320 starts with a squeeze-delay interval which allows extra time during which the welding electrodes may be moved from a fully retracted "at rest" position to a partially extended or "ready" position adjacent to but spaced from the workpiece. When a series of welds are to be made and the welding timer is set for "repeat" operation, welding sequences after the initial one will omit the squeeze delay interval and will begin directly with the squeeze interval. This mode of operation would normally be used when the "ready" and "at rest" electrode positions differ and when the electrodes do not return to the "at rest" position during the course of a continuous series of weld sequences.

It will be noted, however, that the particular embodiment of the invention herein described is readily modified to eliminate the squeeze-delay interval entirely when desired by insertion of suitable switching into the timing unit 320. For example, such switching (not shown) might be provided to disconnect the resistances 361 and 362a from the reference line 92 and connect same to the reset line 182. Simultaneously, such switching would switch the resistances 361a and 362 from the reset line 182 to the reference line 92.

The timing unit 320 is started by the afore-mentioned appearance of a high potential on the collector of the transistor 169 (FIG. 3) of the conditioning unit 140 which positive potential travels by the line 189 to junction point 190 (FIG. 4) to raise the normally low potential thereupon. The transistor 351 (FIG. 5) of the squeeze-delay bistable circuit is normally off whereby its collector is at a high potential and blocks conduction through the diode 347. Hence, the appearance of a high potential at the junction point 196 similarly blocks the diode 345. Thus, the capacitor 336 (FIG. 4) is no longer shunted by the path from point 339, line 344, resistances 346 and the diodes 345 and 347. Therefore, the capacitor 336 commences charging due to current flow through the tap switches 342 and 343. At this time the diodes 347a–d are conductive so that current flowing through the tap switches 342a–d and 343a–d does not contribute to the charge on capacitor 336. The rate at which the capacitor 336 is charged is a function of the setting of the tap switches 342 and 343. The unijunction transistor 322 normally has its emitter at a lower potential than is required for conduction therethrough. Hence, synch spikes resulting from differentiation of the output of the synch generator 110 by the capacitor 333 applied to the upper one of the bases of the unijuntcion transistor 322 cannot effect conduction thereof. However, as the charge on the capacitor 336 reaches a predetermined level, the emitter potential of the unijunction transistor 322 is raised sufficiently to cause conduction thereof upon the appearance of the next position synch spike. The firing point of the unijunction 322 can be advanced or retarded by one or more cycles by varying the setting of the potentiometer 165 and thereby changing the amplitude of the synch spike applied to said unijunction 322. When such conduction occurs, the capacitor 336 is discharged through the unijunction transistor 322 and resistance 331 to place a positive pulse on the line 369 which line is connected to the emitters of the transistors 352–352d (FIG. 5). The positive pulse applied to said emitters turns said transistors off if they are not already off and marks the end of the squeeze-delay time.

Thus, the transistor 352 of the squeeze-delay circuit is shut off which raises the collector potential thereon and said raised potential is applied through the resistance 357 to the base of the normally nonconductive transistor 351 to turn same on. After the end of the afore-mentioned pulse on the line 369, the low potential on the collector of the transistor 351 due to the conduction of same causes the capacitance 371 to apply a negative pulse through the resistance 373 to the base of the transistor 351a of the squeeze bistable circuit which turns same off allowing a high potential to appear on the collector thereof. In this manner, the squeeze bistable circuit is tripped by the ending of the squeeze-delay to start the squeeze time. The time interval required for such charging depends on the settings of the tap switches 342a and 343a in the same manner as was described hereinabove in connection with the charging of said capacitor by the squeeze-delay bistable circuit. The timing unit 320 continues to function in the above-described manner in the operation of each of the succeeding bistable circuits (FIG. 5), that is, the squeeze, weld, hold and off time bistable circuits.

At the end of squeeze time then, the transistors 351b and 352b of the weld bistable circuit are turned, respectively, off and on whereby a high potential appears on the collector of the transistor 351b and a low potential appears on the collector of the transistor 352b.

The high potential on the collector of the transistor 351b blocks the diode 347b and thus allows the capacitor 336 to be charged through the resistances selected by the tap switches 342b and 343b, the settings of said switches thereby determining the weld time interval. Said high and low potentials are also applied, respectively, to the line 504 and to the base of the transistor 516 of the heat control unit 450.

(e) Heat control unit

Turning now to the heat control unit 450 (FIG. 6), the output of the phase-shift circuit 449 is connected through the transformer 451 and the fullwave rectifier comprising the diodes 457 and 458 for impressing a series of negative phase-shifted half waves on the base of the transistor 461. A positive potential is also applied to the base of the transistor 461 through the resistance 464 whereby the positive portion of the composite signal appearing on said base consists of a series of sharp, short positive pulses (FIG. 7–s) by which the transistor 461 is rendered intermittently conductive. The transistor 461 thus conducts a series of short, sharp positive pulses through the secondary 472 of the transformer 471 from the positive potential line 118. The secondary 473 of the transformer 471 places said positive pulses (FIG. 7–t) on the gate of the S.C.R. 477 to intermittently bias the S.C.R. 477 toward conduction. The S.C.R. 477 will not actually conduct, however, until the S.C.R. 498 is biased for conduction.

The S.C.R. 498 is controlled in a somewhat different way and as follows. The afore-mentioned negative going potential from the collector of the transistor 352b of the weld bistable circuit when applied to the capacitor 513 appears as a negative pulse which blocks bias conduction through the diode 514. This drops the base potential of the normally conductive transistor 516 to shut same off whereby a high potential appears on the collector thereof and hence on the base of the normally nonconductive transistor 523 to turn same on. The capacitor 528 normally charges through the resistance 519, diode 514 and resistance 529 due to the normally high potential on the collector of the transistor 523. Hence, when the transistor 523 goes on and its collector potential drops, the potential across the capacitor 528 is reversed whereby said capacitor stops charging and begins discharging through the timing potentiometer 517. The potentiometer 517 is normally set so that the delay caused by the timing out of the capacitor 528 is about ninety degrees in the supply wave. The reversal of potential on the capacitor 528 causes it to block bias conduction through the diode 514 and thereby place a low potential on the base of the transistor 516 to maintain same off until the capacitor 628 times out. The transistor 523 also conducts through the resistance 532 and idode 531 to produce a potential drop across the resistance 532. Thus, the line 504 assumes a low potential which cancels the afore-mentioned increasing potential from the collector of the transistor 351b in the weld bistable circuit of the timing unit 320. After a preselected interval, usually about 90 degrees of the supply voltage, the capacitor 528 times out, whereby the potential on the base of the transistor 516 rises and said transistor conducts which turns off the transistor 523. Thus, there is no longer a voltage drop across the resistance 532 to cancel the increasing potential applied by transistor 351b to the line 504. Said increasing potential is therefore now applied through the resistance 506 to the gate of the S.C.R. 498 to bias same for conduction. The delay of S.C.R. firing during this first half cycle of the weld time interval results in a low average first half cycle weld current which is often desirable for reasons well known to those skilled in the art. With the biasing of the gates of the S.C.R.'s 477 and 498 for conduction as hereinabove described, said S.C.R's 477 and 498 conduct to the reference line 92 from the line 483 which is connected through the resitsance 484 and capacitance 486 (FIG. 4) to the center tap 487 of the trnasformer 489. Hence, current will flow through either one side or the other of the transformer 489 depending on the existing phase position of the supply wave. Such conduction will be fully rectified A.C., that is, a pair of positive half waves in each source cycle. Thus, the anode potential of the S.C.R. 477 will drop below that required for conduction once every 180 degrees of the source. As a result, the phase-shift circuit 449 will restart conduction through the S.C.R. 477 once every half wave cycle at a predetermined phase point (FIG. 7–r) whereby to control the weld current.

Such conduction causes conduction (FIG. 7–u) through one of the secondary windings 566 and 566a of the transformer 489 in the firing circuit 540 (FIG. 2). Hence, one of the thyratrons 541 or 542 will effect conduction of the appropriately connected ignitrons for allowing current flow through the welding transformer 546. Alternate sides of the primary 548 of the transformer 489 will conduct during alternate half cycles of the input transformer 11 and hence the ignitrons 543 and 544 will conduct alterately in the desired manner. Such alternate firing will continue until the capacitor 336 of the timing unit 320 has built up to a predetermined level of charge whereupon the weld time ends and the state of the weld bistable circuit is changed to lower the potential on the line 504. Thus, because the S.C.R. 498 of the heat control unit 450 is no longer biased for conduction and because the anode potential thereon drops at the end of the next half cycle, current flow ceases through the trasformer 489 to cut the flow of welding current through the welding transformer 546. In this manner, a single phase-shift source and a single series valve circuit are employed to control the two thyratrons 541 and 542.

(f) Timing unit—hold time

With the end of weld time, hold time normally starts. As an alternative, however, the switch 379 (FIG. 5) may be opened and the switch 382 may be closed whereby the output of the weld bistable circuit at the end of weld time changes the state of the off bistable circuit rather than that of the hold bistable circuit as would normally be the case, the hold bistable circuit thereby being bypassed.

Returning to the normal mode of operation, switches 379 and 382 will be, respectively, closed and opened. Thus, the drop in potential on the collector 351b occurring at weld time end is applied as a negative pulse by the capacitor 378 to the base of the transistor 351c of the hold circuit to turn same off. The resulting high collector potential blocks the diode 347c and capacitor 336 (FIG. 4) begins charging through the tap switches 342c and 343c to time the hold interval. At the end of said interval, a positive pulse appears on line 369 which shuts off transistor 352c thereby returning the hold bistable circuit to its prehold time state.

(g) Timing unit—return to rest—"single" mode

After the end of the hold time, the resulting low potential on the collector of the transistor 351c turns off the transistor 351d in the off time circuit whereby a high potential appears on the collector thereof. Said high potential is applied through the line 188 to the base of the transistor 171 in the conditioning unit 140 where it has no effect because transistor 171 is already conducting. Said high potential is, of course, used to turn on the transistor 352d of the off time bistable circuit. The low potential on the collector of said transistor 352d is applied through the "single" contacts of the switch part 441 to the point 443 to prevent charging of the timing capacitor 336 through the off timing tap switches 342d and 343d as would normally be caused by a high potential on the collector of the transistor 351d. The low potential on the collector of the transistor 352d is also applied through the line 238 to the base of the transistor 234 in the conditioning unit 140 thereby turning same off and hence de-energizing the transformer 247 which in turn opens the welding electrodes due to the de-energization of the solenoid 308 of the solenoid control circuit 280.

The collector of the transistor 351d is also connected to the "single" contact S of the set of contacts 442 of the repeat-single switch 433. Hence, selection of the "single" mode of operation will connect said collector to the line 266 to apply high potential to the base of the transistor 252 of the memory bistable circuit 249 in the conditioning unit 140 to turn same on and hence to render the transistor 251 nonconductive. Conduction of the transistor 252 drops the potential on the collector thereof whereby the transistor 199 is returned to its normal nonconductive state and conduction through the transformer 58 ceases, whereby the initiating unit 10 is thus no longer "locked on" to the conditioning unit 140. This condition will persist as long as the pilot switch 22 remains closed.

If the pilot switch 22 has been released prior to this time or is now released, the S.C.R. 46 shuts off and the safety relay 39 and transformer 44 are de-energized. This returns the conditioning unit 140 and, in turn, the rest of the welding timer to is "at rest" condition. Such return starts with the return of the transistor 146 to constant conduction which turns transistor 156 nonconductive. Collector potential on the transistor 146 thus drops, unblocking synch spikes from the capacitor 186 to shut off the transistor 171 and thereby to turn on the transistor 169. Constant conduction of transistors 146 and 169 drops the collector potential thereof and thus through the lines 152 and 189, drops the potential on the base of the reset transistor 421 sufficiently that synch spikes applied thereto by the synch line 166 through the capacitor 431 render said reset transistor 421 intermittently nonconductive. The initial collector potential drop is passed through the switch contacts 432 and capacitor 436 to appear on the base of transistor 421 as a negative pulse which insures a reset pulse simultaneously therewith. Thus, positive pulses appear on the reset line 182 to assure proper resetting of the bistable circuits of the timing unit 320 (squeeze-delay, squeeze, weld, hold and off time) and of the bistable circuits of the conditioning unit 140 (169, 171 and 251, 252) whereby the transistors 352, 351a, 351b, 351c, 351d, 169 and 251 conduct.

(h) Timing unit—"repeat" mode

If, on the other hand, the "repeat" mode of operation is elected, the operation is as given above until the end of hold time. The "repeat" mode of operation differs in that the position of contacts 441 prevents the low potential placed on the collector of the transistor 352d at the end of hold time from blocking the charging of the capacitor 336 in the above-mentioned manner. Hence, the timing capacitor 336 will charge through the off time resistances 342d and 343d to measure the off time interval. Furthermore, the contacts 42 when in the "repeat" position connect the collector of the transistor 352d to the line 266 which does not disturb the nonconductive condition of the transistor 252 of the memory circuit 249 in the conditioning unit 140. As in the "single" mode, the line 238 applies the low collector potential of transistor 352d to the base of the transistor 199 to turn same off and thereby retract the welding electrodes at the end of hold time.

Discharge of the capacitor 336 ends its timing of the off interval by returning the off bistable circuit to its original state of transistor 351d conductive and transistor 352d nonconductive. The resulting potential rise on the collector of transistor 352d is impressed by the line 266 on the base of transistor 252 to turn same on and to thereby turn the transistor 251 nonconductive. The low potential on the collector of transistor 252 clamps the base of the transistor 234 low to maintain same nonconductive despite the newly increased potential impressed on the line 238 by the nonconductive transistor 352d. The low potential on the collector of transistor 252 also drops the base potential on transistor 199 to stop conduction thereof whereby the conditioning unit 140 unlocks from the initiating unit 10. The drop in potential on the collector of the transistor 351d is applied through line 188 and capacitor 187 to cause a negative pulse to appear on the base of transistor 171 to shut same off. This turns on the transistor 169 and drops the collector potential thereof to drop the high potential of line 189 connected to said collector. The low potential on the line 189 is applied through diodes 345 and 348 (FIG. 5) to prevent charging of the timing capacitor 336 (FIG. 4) through either the squeeze-delay tap switches 342 and 343 or the squeeze tap switches 342a and 343a. The cessation of conduction of transistor 171 raises the collector potential thereon and stops conduction of the diode 221 through the resistance 219. As a result, the voltage divider comprised of the resistances 219, 222 and 228 impresses a positive potential upon the base of the transistor 223 which is sufficiently high as to cause continuous conduction thereof despite synch pulses applied thereto through the resistances 224 and 226. The resulting low potential on the collector of the transistor 223 acts in a manner similar to low potential on the collector of the transistor 252 which was described hereinabove in maintaining transistor 234 nonconductive. The drop in collector potential of the transistor 351d is also applied through the capacitor 372 to the base of the transistor 351a of the squeeze bistable circuit to turn same off whereby the potential thereof rises.

However, the potential rise on the collector of transistor 351a cannot start the squeeze interval timing because of the afore-mentioned low potential on line 189. Assuming the pilot switch 22 to still be closed, the next potential drop on the synch line 166 (FIG. 3) will apply a negative pulse through capacitor 167 while the collector of transistor 156 is at a low potential. Thus, as discussed hereinabove with respect to original energizing of the conditioning unit 140, the transistor 169 will be turned off and a high potential will again appear on line 189. The potential rise in the line 189 acts through capacitor 261 to place a positive pulse on the base of transistor 251 thereby turning same on and turning off the transistor 252 to return the bistable circuit 249 to its original state. Thus, the transistor 252 will not block the proper operation of the transistors 199 and 234 when they are triggered during the succeeding circuit operation. The combination of high potentials on line 189 and the collector of transistor 351a allows charging of capacitor 336 to begin timing of the new squeeze time interval with which the welding timer begins its second sequence.

If, on the other hand, the pilot switch 22 has been allowed to open during a sequence, said sequence continues until its end and the timer then returns to its "at rest" condition. Thus, the sequence continues as described above except that with the de-energization of the transistor 199, the S.C.R. 46 of the initiating unit 10 will shut off for lack of a suitable gate signal from either of the transformers 19 or 59. Cessation of conduction of S.C.R. 46 de-energizes the transformer 44 and safety relay 39. Thus, transistors 146 and 156 return to their "at rest" condition and the timer continues to its "at rest" condition in the manner indicated hereinabove with respect to the "single" mode of operation.

Although a particular, preferred embodiment of the invention has been disclosed hereinabove for purposes of illustration, it will be understood that variations or modifications of such disclosure which lie within the scope of the appended claims are fully contemplated.

What is claimed is:

1. In a welding timer for controlling the welding of a workpiece, the combination comprising:
   an alternating source of input potential and means responsive thereto for providing synch signals;
   an initiating unit energizable to start said timer;
   a conditioning unit responsive to energization of said initiating unit for starting operation in synchronism with said alternating input potential and means in said conditioning unit responsive to said synch signals for maintaining said initiating unit energized;
   an electrode moving unit and means in said conditioning unit responsive to said synch signals for causing said electrode moving unit to apply welding electrodes to the workpiece in timed relation with said alternating source;
   a timing unit and means in said conditioning unit responsive to said synch signals for causing said timing unit to begin sequencing a plurality of welding functions in timed relation with said alternating source;
   a heat control unit and a single source of alternating potential phase shiftable from said input potential feeding said heat control unit, said heat control unit being controlled by said timing unit for controlling the flow of current to said welding electrodes.

2. In a welding timer for controlling the operation of welding electrodes with respect to a workpiece, the combination comprising:
   an alternating potential source and a synch generator for generating pulses precisely synchronized with said alternating potential source;
   a pilot switch and an initiating unit connected across said alternating potential source, closure of said pilot switch beginning the operation of said initiating unit;
   a constant amplitude D.C. potential source;
   a conditioning unit connected across said constant potential source and to said initiating unit and synch generator, operation of said initiating unit causing said conditioning unit to start operation soon thereafter at a time determined by said synch generator, said conditioning unit when in operation feeding signals synchronized with said alternating potential source back to said initiating unit for maintaining said initiating unit locked in operation regardless of the condition of the pilot switch;
   a timing unit for timing a plurality of sequenced intervals and comprising a ring counter capable of a plurality of different states each corresponding to one of said intervals, a starting circuit for changing the state of said ring counter and a timing network for timing said intervals, said starting circuit being connected to said synch generator, said timing unit being connected across said constant potential source and connected to said conditioning unit whereby said conditioning unit starts said timing unit as said initiating unit is locked in operation;

an electrode moving unit for extruding welding electrodes into contact with the workpiece energized by said conditioning unit simultaneously with the energization of said timing unit;

a heat control unit connected across said constant potential source and a phase-shifted alternating potential source source connected to said heat control unit, said heat control unit including a series pair of valves one of which is triggerable by said phase-shifted source and the other of which is connected to and trigggerable by said ring counter, said heat control unit including delay means for delaying triggering of said other valve by said ring counter for a preselectable interval;

a firing circuit in series with the welding electrodes and said alternating potential source, said firing circuit being energized upon conduction through said pair of valves to conduct through said welding electrodes;

reset circuitry connected to said timing and conditioning units for returning said ring counter and elements of said conditioning unit to a preselected condition, said reset circuit being connected across said constant potential source and to said synch generator for triggering thereby, and means connecting said reset circuit to said conditioning unit whereby triggering of said reset circuit by said synch generator is blocked during preselected ones of said timed intervals by said conditioning unit.

3. In a welding timer for controlling the welding of a workpiece, the combination comprising:

an alternating potential source;

an initiating unit comprising a pair of trigger devices and means connecting said trigger devices to said alternating potential source;

a source of constant positive potential;

a conditioning unit including an initial memory circuit and transformer means connecting same to the second of said trigger devices whereby energization of said second trigger device changes the state of said initial memory circuit;

a feedback transformer and means connecting same to said initial memory circuit for energization thereby upon said change of state, said feedback transformer also being connected to control the operation of said second trigger device, whereby said second trigger device is capable of operating independently of said first trigger device while said initial memory circuit is in its changed state;

weld electrodes, a weld electrode positioning unit energizable for positioning said welding electrodes with respect to said workpiece for welding same and transformer means connecting same to said conditioning unit for energization thereby upon said change in state of said initial memory circuit;

a timing unit including a plurality of serially operable bistable circuits, a starting circuit for sequentially changing the state of said bistable circuits and timing means for controlling in time the operation of said starting circuit, and means connecting said timing unit to said initial memory circuit whereby said particular change in state thereof causes said timing circuit to commence timing a predetermined interval, said bistable circuits thereafter operating serially until the last one thereof changes state, said conditioning unit and said last one of said bistable circuits being connected for returning said initial memory to its original condition to de-energize said feedback transformer and said control unit and to remove said starting signal from said timing unit; and means responsive to operation of one of said bistable circuits for supplying weld current to said electrodes.

4. In a welding timer, the combination comprising:
a source of alternating potential;
an initiating unit connected across said source of alternating potential and a pilot switch connected thereto for starting same;

a conditioning unit including an initial memory circuit which changes state upon energization by said initiating unit, said conditioning unit including a further memory circuit;

feedback means connecting said initial memory circuit to said initiating unit for maintaining said nitiating unit in operation regardless of the position of the pilot switch and signal means in said conditioning unit furnishing an output upon a change of state of said initial memory circuit;

a control circuit for controlling the gripping of a workpiece by a pair of weld electrodes and energizable by said output of said signal means;

a timing unit connected to said conditioning unit and including a set of bistable circuits and means arranging said bistable circuits for beginning operation in a sequence corresponding to the sequence of operations in performing a weld, said operation beginning upon the appearance of said output and means connecting the last operated one of said bistable circuits to said further memory circuit, said last mentioned means including a manually actuable further switch having alternative positions, said further switch in one position coupling said one bistable circuit to said further memory circuit whereby a change in state of said one bistable circuit changes the state of said further memory circuit, said further memory circuit being coupled to said initial memory circuit to disable said feedback means upon said change in state, said further switch in another position breaking said coupling of said one bistable circuit and said further memory circuit;

whereby continued actuation of said pilot switch is ineffective to cause a further weld when said further switch is in said one position.

5. In a welding timer for controlling the operation of welding electrodes on a workpiece, the combination comprising:

an alternating potential source and a synch generator for generating pulses precisely synchronized with said alternating potential source;

a pilot switch and an initiating unit connected across said alternating potential source, closure of said pilot switch beginning the operation of said initiating unit;

a constant amplitude D.C. potential source;

a conditioning unit connected across said constant potential source and to said initiating unit and synch generator, operation of said initiating unit causing said conditioning unit to start operation thereafter at a time determined by said synch generator, said conditioning unit when in operation feeding signals synchronized with said alternating potential source back to said initiating unit for maintaining said initiating unit locked in operation regardless of the condition of the pilot switch;

means connected across said constant potential source for operating said electrodes and to said conditioning unit through a first path;

said means being started into operation by said conditioning unit simultaneously with the locking in of said initiating unit, said means rendering said electrodes inoperative after a preselected interval and being connected to said conditioning unit through a second path for unlocking said initiating unit from said conditioning unit after said preselected interval;

whereby opening of said pilot switch causes said timer to become inoperative after said electrodes have become inoperative.

6. In a welding timer for controlling the operation of welding electrodes on a workpiece, the combination comprising:

initiating means for starting the operation of said timer;

an electrode moving unit responsive to said initiating means for placing the weld electrodes in welding position with respect to the workpiece;

timing means activated by said initiating means for allowing current flow through said welding electrodes for a predetermined time period;

a heat control unit and a phase-shifted alternating potential source connected to said heat control unit, said heat control unit including a series pair of valves, one of which is triggerable by said phase-shifted source and the other of which is connected to and triggerable by said timing means, said heat control unit including delay means connected to said other valve for delaying triggering thereof for a preselectable interval;

a source of alternating potential and firing circuitry connected in circuit with and energizable to produce weld current flow through said welding electrodes and connected to said series pair of valves for energization by said alternating potential source upon conduction through said series pair of valves.

7. In a welding timer for controlling the operation of welding electrodes with respect to a workpiece, the combination comprising:

synch generator means generating at least an evenly spaced series of pulses of one polarity;

a constant D.C. potential source;

a first valve having a control electrode for controlling conduction therethrough and first means connecting said first valve across said constant potential source;

second means connected to said control electrode for selectably impressing a potential of polarity opposite said one polarity on said control electrode to render and maintain said first valve conductive;

third means connected between said generator means and said control electrode for impressing said pulses of said one polarity on said control electrode to render said first valve intermittently nonconductive;

circuitry for placing said welding timer in operation including second and third valves connected across said constant potential source and each having an electrode capable of assuming a potential of either said one or opposite polarity depending on the conduction states thereof;

means for positioning said weld electrodes in position for welding the workpiece and means for applying welding current to said weld electrodes, said positioning means and current applying means being energized in response to turning off of said third valve;

said third means also connecting said electrodes of said second and third valves to said control element of said first valve for blocking application of said one polarity pulses to said control element when either said second or said third valve is nonconductive whereby said first valve remains conductive despite said one polarity pulses.

8. The device defined in claim 7 including differentiating means selectably connectible between said electrode of said third valve and said control element of said first valve to impress a pulse of said one polarity on said control element at the beginning of conduction of said third valve to momentarily shut off said first valve;

said means for applying weld current having a timing unit including switch means having a plurality of different settings, timing means for changing the setting of said switching means in a preselected sequence after preselectable intervals for timing a sequence of corresponding weld functions and means starting said timing unit at cessation of conduction of said third valve;

pilot means energizeable to cause said third valve to shut off and means responsive to completion of said welding functions for turning said second and third valves on after de-energization of said pilot means whereby said first valve shuts off upon the occurrence of the next one of said one polarity pulses impressed thereon by said synch generator means to change the potential on an element thereof;

conduction means connecting said element of said first valve at least to said switch means, said change in potential causing said switch means to be reset to its initial condition.

9. The device defined in claim 7 wherein:

said second means includes a further valve normally having said opposite polarity potential on one electrode thereof when nonconductive and having said one polarity potential on said one electrode when conductive, said further valve having a control element; and including a voltage divider across said D.C. potential source comprising resistance means with a capacitor at one end thereof, said voltage divider being connected to said control element intermediate the ends thereof, turning on of said D.C. potential source charging said capacitor at a rate determined by said resistance means, the resulting potential appearing on said control element first turning on said further valve and, after a predetermined charge has been placed on said capacitor, turning off said further valve;

whereby said first valve will fall nonconductive following the turning on of said D.C. potential.

10. In a welding timer for controlling positioning of welding electrodes with respect to a workpiece and for controlling current flow therethrough, the combination comprising:

one bistable circuit including first and second switching devices and signal means placing said one bistable circuit in a first state;

means responsive to said signal means for providing weld current to the weld electrodes prior to placing said one bistable circuit in said one state;

a further bistable circuit capable of changing state upon application of a potential thereto;

a switch actuatable between first and second conditions for alternately connecting said first and second switching devices, respectively, to said further bistable circuit;

means placing said potential on said first switching device when said one bistable circuit is in said first state whereby to effect said change in state of said further bistable circuit when said switch is in said first condition;

means energizable for moving the welding electrodes into operative position with respect to said workpiece for welding same, said energizable means being connected to said further bistable circuit and de-energized by said change in state therein whereby to allow a new welding operation to be thereafter selected.

11. The device defined in claim 10 including:

a timing device and means connecting same across a voltage source, said timing device being connected to said signal means for causing said signal means to change said one bistable circuit from said first state to a second state at the end of a time period determined by said timing device;

means connecting said first switching device to said timing device for allowing said timing device to begin timing upon appearance of said potential on said first switching device;

said switch including means connecting said second switching device to said timing device when said switch is in said first condtion to prevent timing of said timing device whereby said one bistable circuit will not change to said second state due to said timing device and further weld sequences are prevented.

12. The device defined in claim 11 including:

a third bistable circuit and means connecting same to said timing device, said third bistable circuit being capable of a first state wherein timing of said timing device is allowed thereby and being capable of a second state wherein timing of said timing device is not initiated thereby;

means connecting said first switching device to said third bistable circuit capable of changing said third bistable circuit from said second to said first state upon disappearance of said potential from said first switching device;

whereby said third bistable circuit is prevented from initiating timing of a new weld sequence by said timing device while said one bistable circuit is in its first state.

13. In a welding timer for controlling positioning of welding electrodes with respect to a workpiece and for controlling current flow therethrough, the combination comprising:

one bistable circuit including first and second switching devices and signal means placing said one bistable circuit in a first state;

means responsive to said signal means for providing weld current to the weld electrodes prior to occurrence of said first state;

a timing device and means connecting same across a voltage source;

said signal means being connected to said timing device for causing said signal means to change said one bistable circuit from said first state to a second state at the end of a time period determined by said timing device;

means connecting said first switching device to said timing device for allowing said timing device to begin timing upon appearance of a potential on said first switching device;

circuitry means operative for moving the weld electrodes into operative relationship with a workpiece for effecting welding thereof, said operative means being de-energized upon assumption of said first state by said one bistable circuit;

a further bistable circuit capable of changing state upon application of a potential thereto;

a switch actuatable between first and second conditions for alternately connecting said first and second switching devices, respectively, to said further bistable circuit;

means placing said potential on said second switching device when said one bistable circuit changes to said second state whereby to effect said change in state of said further bistable circuit when said switch in in said second condition.

14. The device defined in claim 13 including:

a third bistable circuit and means connecting same to said timing device, said third bistable circuit being capable of a first state wherein timing of a period prior to welding by of said timing device is allowed thereby and being capable of a second state wherein timing of said timing device is not initiated thereby;

means connecting said first switching device to said third bistable circuit capable of changing said third bistable circuit from said second to said first state upon disappearance of said voltage from said first switching device;

a fourth bistable circuit for controlling the initiation of timing the weld sequence by said timing device, said circuit when in a first state allowing such timing and when in a second state preventing initiation of timing of said timing device by said third bistable circuit, said timing device thereby requiring said third and fourth bistable circuits to be in their first state for timing thereby of a weld sequence;

means connecting said first switching device to said fourth bistable circuit for changing said fourth bistable circuit to said second state to prevent timing by said timing device when said one bistable circuit changes to its second state;

pulse producing means connected to said fourth bistable circuit for returning said fourth bistable circuit to said first state;

whereby said third bistable circuit initiates timing by said timing device.

15. In a welding timer, the combination comprising:

a D.C. potential source:

a first valve connected across said D.C. source and having a control element;

weld electrodes and means responsive to conduction of said first valve for supplying weld current to said weld electrodes;

first and second voltage dividers connected across said D.C. source and isolating means connecting said control element intermediate the ends of each of said voltage dividers, said first voltage divider preventing the potential of said control elements from falling below a minimum level and said second voltage divider preventing the potential on said control electrode from rising past a maximum level;

a third voltage divider connected across said D.C. source and a second valve connected intermediately the ends of said third voltage divider for controlling current flow therethrough, one end of said second valve having a potential thereon numerically greater than said minimum potential when said second valve is nonconductive and numerically less than said minimum potential when said second valve conducts;

unidirectional means connecting said one end of said second valve to said control element of said first valve and having a resistance in series therewith, said unidirectional means and resistance allowing current flow therethrough between said control element and said third voltage divider when said second valve is conductive, said resistance having a voltage drop there-across to maintain said control element at said minimum potential level, said unidirectional means preventing influence of the potential on said control element by said second valve when said second valve is nonconductive;

further means connected to said one end of said second valve and responsive to nonconduction thereof for moving the weld electrodes into position for welding the workpiece;

means connected to the control element of said first valve for varying the voltage thereon;

means connected to said first valve for timing same after said maximum potential level appears on said control element;

whereby said first valve is prevented from firing when said second valve is conductive.

16. The welding timer defined in claim 5 in which said initiating unit includes:

a first valve, said pilot switch when closed placing said alternating potential upon said first valve for placing a pulse having a preselected phase relationship with said alternating potential upon a control element of said first valve whereby said first valve begins conduction at a first preselected point on the wave form of said alternating potential;

first transformer means in series with said first valve and which, upon conduction of said first valve, produces a series of partial half waves alternating with a series of reactive kick pulses of opposite polarity;

a second valve having said source of alternating potential applied thereto upon closure of said pilot switch, said first transformer being connected to said second valve to impress said reactive kick pulses thereon for causing said second valve to conduct at a second preselected point on the applied wave form of said alternating potential;

switch means closeable by conduction of said second valve for applying said alternating potential thereto after said pilot switch is opened;

third transformer means paralleling said secondary portion of said first transformer means for causing periodic conduction of said second valve after cessation of conduction through said first valve;

second transformer means in series with said second valve for producing a periodic output due to conduction therethrough by said second valve.

17. The welding timer defined in claim 5 in which said conditioning unit includes:

a circuit element and means for placing a high potential on said circuit element in a definite phase relationship to said alternating potential for signalling the starting of the timing of the welding operation;

switch means actuatable by said high potential for insuring continued operation of said conditioning unit;

further switch means actuatable by said high potential for causing said electrode operating means to close the welding electrodes.

18. The welding timer defined in claim 6 in which said heat control unit includes:

full wave rectifier means acting on said phase-shifted alternating potential for producing a series of negative half waves of voltage;

a source of positive potential and means adding said positive potential to said negative half waves for producing a series of sharp positive pulses;

said series pair of valves comprising a first S.C.R. and a second S.C.R.;

means feeding said sharp positive pulses to the gate of said first S.C.R.;

said timing means placing a positive potential on the gate of said second S.C.R.;

said delay means producing a negative potential for blocking said positive potential for a predetermined period of time whereafter said positive potential is unblocked to allow conduction through said first S.C.R. and said second S.C.R.;

transformer means having the center tap of a center tapped primary winding in series with one of said first and second S.C.R.'s and having the ends of said primary winding connected across said source of nonphase-shifted alternating potential and the other of said first and second S.C.R.'s being connected to said source of nonphase-shifted alternating potential whereby current flow through said S.C.R.'s allows the legs of said primary winding to conduct alternatingly, said transformer means including a pair of identical second windings each controlled by a corresponding one of said legs;

said firing circuit including a pair of welding current control valves each having a separate one of said secondary windings connected thereto for controlling current flow therethrough.

References Cited

UNITED STATES PATENTS

| | | | |
|---|---|---|---|
| 2,835,864 | 5/1958 | Decker et al. | 219—114 |
| 3,243,652 | 3/1966 | Meyer et al. | 219—108 X |
| 3,258,697 | 6/1966 | Guettel | 328—63 |
| 3,378,696 | 4/1968 | Eckl et al. | 307—221 |

DONOVAN F. DUGGAN, Primary Examiner

U.S. Cl. X.R.

219—114; 307—221; 328—63